United States Patent [19]

Kato et al.

[11] Patent Number: 4,772,965
[45] Date of Patent: Sep. 20, 1988

[54] CASSETTE LOADING MECHANISM FOR A RECORDING AND/OR REPRODUCING APPARATUS

[75] Inventors: Masahiro Kato; Yuji Yokota, both of Chichibu; Yuichi Kakuta, deceased, late of Fukushima, all of Japan, by Rokuroh Kakuta, legal representative

[73] Assignee: Canon Denshi Kabushiki Kaisha, Saitama, Japan

[21] Appl. No.: 858,718

[22] Filed: May 2, 1986

[30] Foreign Application Priority Data

May 7, 1985 [JP] Japan .................................. 60-95564
Aug. 19, 1985 [JP] Japan ................................. 60-180475

[51] Int. Cl.$^4$ ........................ G11B 17/04; G11B 19/00
[52] U.S. Cl. ..................................... 360/71; 360/96.5; 360/97
[58] Field of Search .................. 360/69, 71, 97, 99, 360/96.5, 86, 96.6; 369/77.1, 77.2

[56] References Cited

U.S. PATENT DOCUMENTS

| | | | |
|---|---|---|---|
| 4,562,498 | 12/1985 | Shibata | 360/97 |
| 4,604,666 | 8/1986 | Kitahara et al. | 360/99 |
| 4,628,376 | 12/1986 | Kato et al. | 360/71 |
| 4,635,149 | 1/1987 | Okita et al. | 360/97 |
| 4,656,544 | 4/1987 | Yamanouchi | 360/97 |
| 4,670,802 | 6/1987 | Ogawa et al. | 360/97 |

Primary Examiner—Raymond F. Cardillo
Assistant Examiner—Steven R. Garland
Attorney, Agent, or Firm—Spencer & Frank

[57] ABSTRACT

An automatic cassette loading mechanism which includes a holder which is movable in a first direction and in a second direction which is nonparallel to the first direction. The mechanism additional includes a driving motor, an insertion detecting switch, a loading completion switch, and a home position switch.

2 Claims, 27 Drawing Sheets

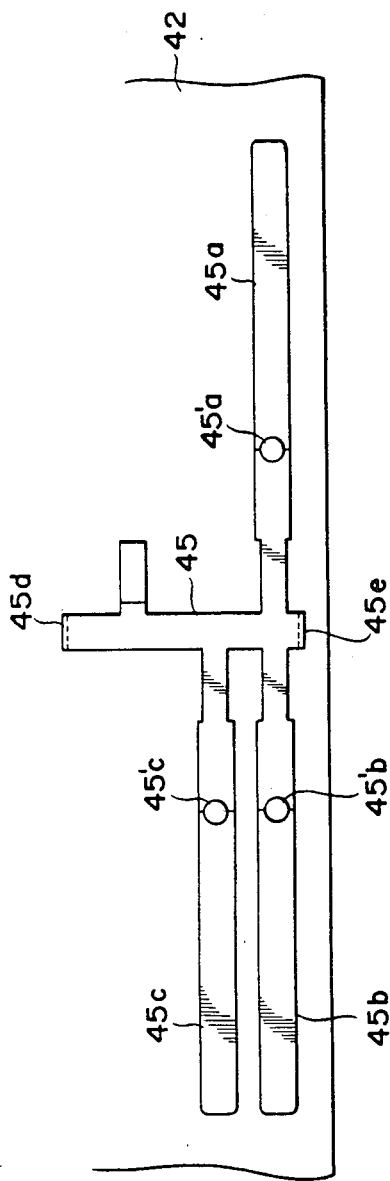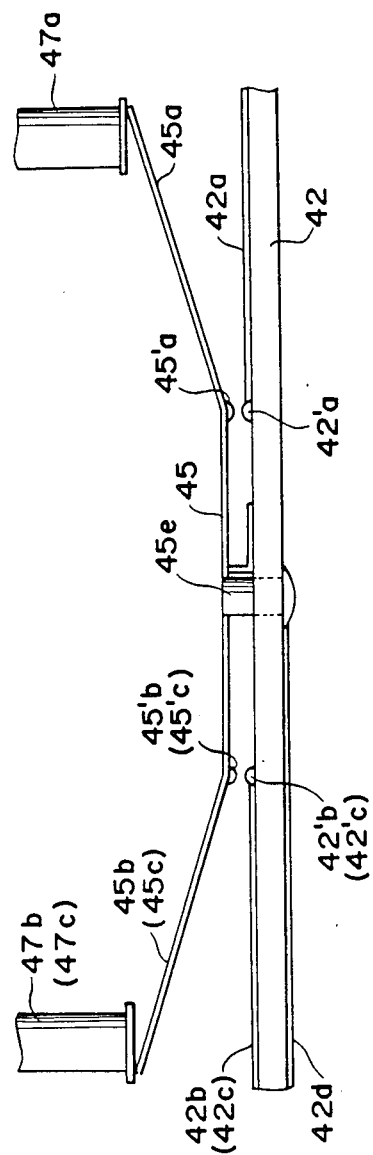
FIG. 9A
FIG. 9B

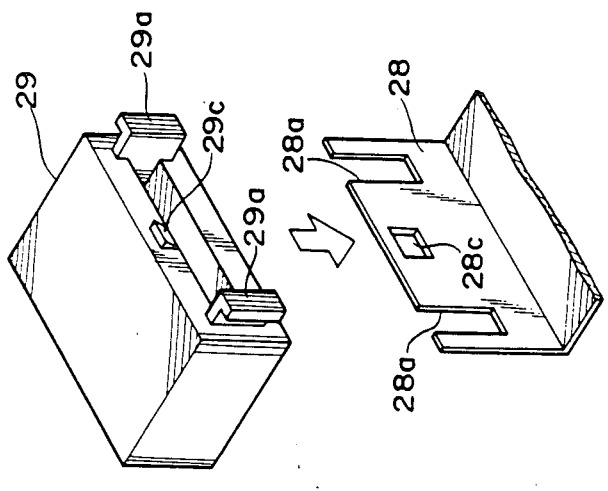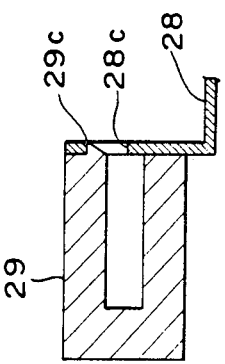
FIG. 12A  FIG. 12B
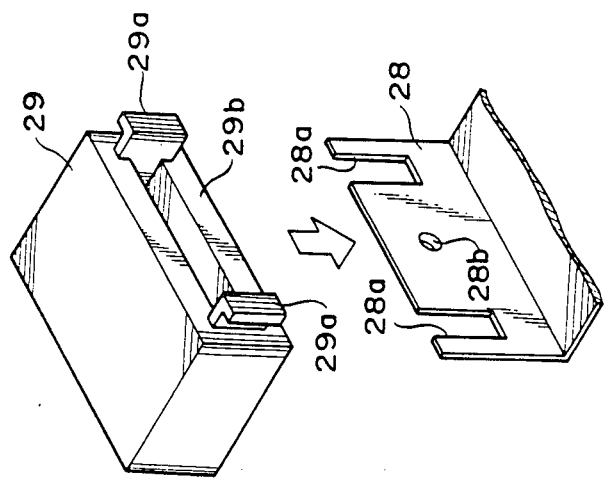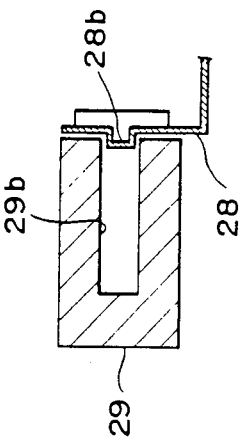
FIG. 11A  FIG. 11B

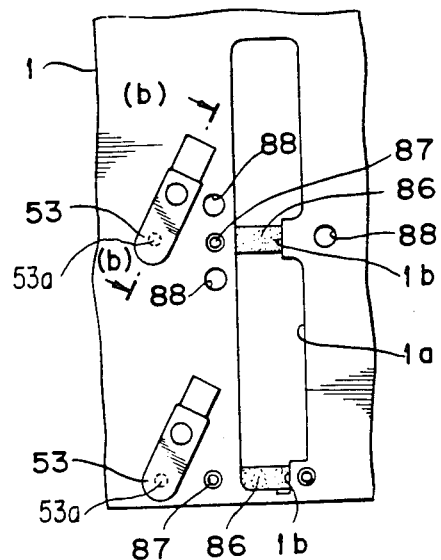
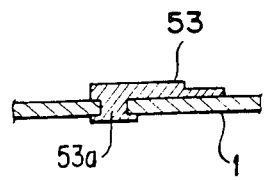
FIG. 15B
FIG. 15A
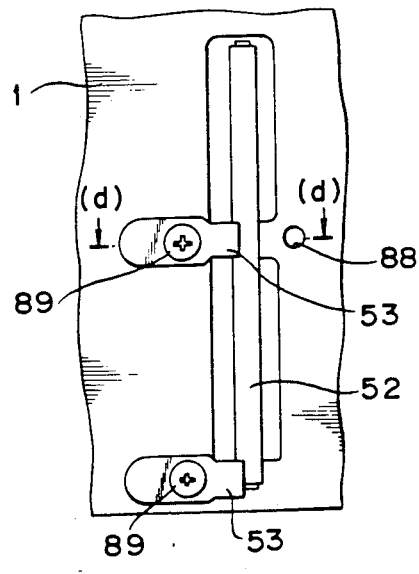
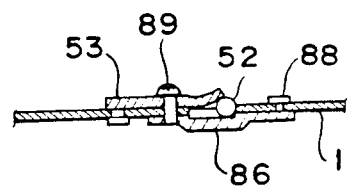
FIG. 15D
FIG. 15C

CASSETTE LOADING MECHANISM FOR A RECORDING AND/OR REPRODUCING APPARATUS

BACKGROUND OF THE INVENTION

1. Field of the Invention

The present invention relates to a recording and/or reproducing system.

1. DESCRIPTION OF THE PRIOR ART

In a recording and/or reproducing system, for example a magnetic disc unit such as a floppy disc unit for performing recording and/or reproducing on a magnetic recording medium such as a floppy disc, a holder for containing a cassette containing a magnetic disc is disposed. In many arrangements, this holder is lowered automatically when the cassette is inserted as far as a first predetermined position inside the unit so that the cassette is loaded in a second predetermined position where recording and/or reproducing is performed on and/or from the disc.

In this type of conventional system, however, when the direction of insertion of the cassette is a first direction, the holder is lowered in a second direction which intersects at right angles with the first direction so that when the cassette is inserted into the holder through an opening on a front panel, an operator had to push with fingertips a back edge of the cassette inside the opening on the front panel so that the cassette is positioned at the first predetermined position. Consequently, the cassette loading operations were troublesome, and often faults arose easily.

Moreover, a conventional apparatus for performing cassette loading and ejection has many levers and slide members. Loading and ejection operations are performed by sequential movement of these levers and slide members so that even a small discrepancy in a timing of the sequential movement prevents loading and ejection operation, causing a high rate of faults. Furthermore, the large number of parts means a large number of assembling steps which produces the disadvantage of increasing the cost of the product.

Moreover, a magnetic disc unit for handling a cassette having an opening (head window) that exposes a part of a disc and an opening and closing member (shutter) that allows for opening and closing of the head window has a member for releasing the head window by acting on an edge of the shutter when the cassette is being loaded. Conventional arrangements have a pin-shaped cylindrical member as this member.

In this type of conventional magnetic disc unit, however, when a diameter of this pin is small, it sometimes becomes impossible to perform the ejection because this pin gets stuck between the cassette housing and the edge of the shutter when the cassette is being ejected. On the other hand, when the diameter of this pin is too large the linkage with the edge of the shutter is not performed adequately, so that faults such as improper opening occur.

Commonly, however, a flat spring is disposed on the holder so that the cassette is held pressingly at a predetermined position inside the holder such as an inside bottom surface of the holder. In a conventional magnetic disc unit, this flat spring was attached to the holder by forcing a joining member such as a rivet into an eyelet, or by a joining member such as a screw.

This type of joining member, however, offered poor workability when being attached, and resulted in high assembling costs.

In a magnetic disc unit such as described above, the magnetic head for recording and/or reproducing must move along the surface of the magnetic disc while maintaining a precision attitude in a left-to-right and up-and-down direction.

In a conventional arrangement, a fixed carriage guide shaft was disposed with respect to a head carriage that mounted a head. The carriage has a plurality, for example two hole-shaped slider portions into each of which a bushing is fitted. The guide shaft is inserted through these bushings.

This arrangement required, however, that the carriage slider portions, that is the holes in which the bushings are fitted, be formed with a high degree of accuracy so as to align. Consequently, the arrangement involved high working costs. Furthermore, if there was any discrepancy in the alignment, it was not possible to adjust this later so that there was the disadvantage that a high degree of accuracy was required from the first.

This disadvantage was not limited, of course, to a magnetic disc unit, but was also encountered in other recording systems such as a system for recording and/or reproducing on and/or from an optical disc or a printer having a mechanism for moving a print head.

The carriage guide shafts are attached to a chassis base plate of the unit. In the conventional arrangement, this attachment was performed by pressing the guide shafts into a positioning notch formed on the chassis base plate by a free edge of a leaf spring whose one other end was fixed to the base plate by a screw.

Consequently, in a conventional magnetic disc unit the operations for attaching guide shafts were extremely troublesome, and had the disadvantages of poor workability and high working costs.

These disadvantages were not limited, of course, to magnetic disc units, but were also encountered on other recording and/or reproducing systems and on printers having a head carriage mechanism.

When, however, travel of the head carriage described above was performed by, for example, a lead screw driven by a stepping motor, adjustment of the motor and the screw attachment position was necessary in order to guarantee the travel position accuracy of the magnetic head on the magnetic disc, that is the track accuracy. Furthermore, in other cases such as when a photo-coupler performs detection of a position corresponding to a standard position of the head or head carriage, for example track number "0" on the magnetic disc, adjustment of the attachment position of the detector is also necessary.

In conventional arrangements, adjustment of the position of this type of unit has been performed by a metallic eccentric screw or eccentric pin attached to the chassis base plate. Attachment of the eccentric screw or eccentric pin to the base plate was troublesome, however, particulary in the case of an eccentric pin which had to be attached to the base plate by tightening in a rotatable manner to allow for adjustment, thereby further diminishing the workability.

This tendency was not limited, of course, to units such as motors, screws or detectors, but was also encountered when adjusting the positions of various other members requiring such adjustment.

Recording and/or reproducing systems such as magnetic disc units, however, as well as other apparatuses have various detection switches and operating switches. In general, these types of switches have a switch contact arm, an operating member for operating that switch contact arm and a supporting member mounted on a base plate for supporting that operating member.

In conventional switch arrangements, however, when a switch mechanism was assembled on a base plate, an assembling step of fitting the supporting member into a hole formed on the base plate was performed, thereby diminishing workability and increasing working costs.

Normally, a plurality of switches such as detection switches and operating switches are disposed. In such cases, conventional arrangements often involved mounting each of this plurality of switches completely independently. This, however, increased the number of parts and had the disadvantages of poor workability of assembling operations and higher working costs.

Generally, however, in electronic apparatuses having a motor to provide drive, a yoke plate of the motor (for example, a stator yoke plate on a brushless motor) is attached to the chassis base plate. If we consider, for example, a motor for driving a magnetic disc in a magnetic disc unit, when a flat brushless motor is used the stator yoke plate is sometimes attached to the chassis base plate with studs and sometimes without studs.

This arrangement, however, makes it difficult to keep the overall apparatus thin and light, and also prevents cost reductions because of the number of parts involved.

SUMMARY OF THE INVENTION

It is, therefore, a first object of the present invention to provide an improved arrangement of a recording and/or reproducing system, and electronic apparatuses and mechanisms applicable to such a system.

It is a second object of the present invention to provide a recording and/or reproducing system having a cassette loading and ejection mechanism which facilitates a loading operation of a recording medium and which provides a favorable loading condition.

It is a third object of the present invention to provide a recording and/or reproducing system having a cassette loading and ejection mechanism which permits secure cassette loading and ejection operations.

It is a fourth object of the present invention to simplify an arrangement of a cassette loading and ejection mechanism so as to reduce the size of the apparatus and to reduce the rate of occurrence of faults.

It is a fifth object of the present invention to provide a recording and/or reproducing system which can act on a shutter of a cassette having a shutter so that a head window of the cassette is opened securely, and which allows for smooth ejection of the cassette without interfering with the head window.

It is a sixth object of the present invention to provide a recording and/or reproducing system which simplifies an attachment operation of a leaf spring for providing support by pressing a cassette into a holder, thereby allowing for lower manufacturing costs.

It is a seventh object of the present invention to provide a new carriage guide mechanism or a recording and/or reproducing system having such new carriage guide mechanism which can support with precision an attitude of a head with respect to a recording medium by securing a wide margin of freedom for adjustment without requiring that an alignment between insertion holes of bushings in a plurality of slider portions for carriage guide shafts of a head carriage, that is bearings for sliders be secured.

It is an eighth object of the present invention to provide a recording and/or reproducing system that dramatically simplifies the operations for attaching a head carriage guide shaft to a chassis base plate so as to provide excellent workability and lower working costs.

It is a ninth object of the present invention to simplify an attachment of a position adjusting member for a member requiring such adjustment to a base such as a chassis base plate, thereby contributing to automation of assembling and to lowering of the costs of an apparatus.

It is a tenth object of the present invention to provide a new switch mechanism that dramatically simplifies operations when a switch mechanism is arranged on a base plate particularly when attaching the above-mentioned supporting member to a base plate, thereby allowing for large cost reductions due to automation.

It is an eleventh object of the present invention to provide a switch mechanism that reduces a number of parts in an arrangement having a plurality of switches and that offers both excellent workability and cost performance.

It is a twelfth object of the present invention to provide a drive mechanism that can make a large contribution to reducing the overall thickness and weight of an apparatus in which it is used and that can produce large cost savings.

In the first aspect of the present invention, a recording and/or reproducing system comprises:

a holder having an opening for accepting a recording medium from a first direction, the holder being movable in the first direction and in a second direction which is inclined with respect to the first direction;

a biasing member for biasing the holder in the first and second directions; and a latch member for latching the holder at a predetermined position against the biasing member and for releasing the latch when the recording medium is inserted into the holder at the predetermined position to position the holder at a recording and/or reproducing position.

Here, the recording and/or reproducing system may further comprise a holding member for biasing and holding the recording medium in the first direction inside the holder in relation to a latch releasing operation of the latching member. The recording medium may be housed in a cassette and the cassette may have an opening for exposing a portion of the recording medium and a shutter which can open and close the opening, and the system may further comprise a releasing member for acting on the shutter in the course of inserting the cassette into the holder at the predetermined position to release the opening, and the latch member may release the latch in relation to an operation of the releasing member.

The recording and/or reproducing system may further comprise a reset member for resetting the holder to an original position against the biasing means, and wherein the latch member and the releasing member may move cooperatively with respect to the resetting operation so as to eject the cassette from the holder. The releasing member may have a pin having a notched portion which acts on a portion of the shutter to open the opening. The recording medium may be housed in a cassette, and may further comprise a leaf spring for generating a biasing force for holding the cassette in the holder, the leaf spring being attached to the holder by bending a claw portion disposed integrally with the leaf spring or the holder.

Here, the recording and/or reproducing member may further comprise a head for performing recording and/or reproducing in and/or from a recording medium, a carriage mounting the head, a guide shaft for guiding the carriage, and a slidably engaging member disposed on the carriage to slide along the guide shaft, the engaging member having a first bearing fixed to the carriage and a second bearing attached to the carriage after an alignment has been adjusted with reference to the first bearing. The carriage may have a first member for supporting the first bearing and a second member for supporting adjustably an attachment position of the second bearing, which is adhered and fixed to the second portion after the adjustment of alignment. The recording and/or reproducing member may further comprise a head for performing recording and/or reproducing in and/or from a recording medium, a carriage mounting the head and a guide shaft for guiding the carriage, the guide shaft being supported by a synthetic resin holding member formed by outsert molding and attached to a chassis.

The recording and/or reproducing system may further comprise a position adjusting member for adjusting a position of a member to be mounted and fixed to a chassis after the position adjustment, the position adjusting member being formed by outsert molding of a synthetic resin material and mounted to a chassis base plate. The recording and/or reproducing system may further comprise a switch contact member, an operating member for operating the contact member and a supporting member for supporting the operating member, the supporting member being formed by outsert molding of a synthetic resin material and attached to a base plate. The recording and/or reproducing system may further comprise a switch mechanism which has an electrically conductive leaf spring member having a plurality of movable contact members and a mount portion to be mounted to a printed circuit board, a plurality of fixed contacts disposed on the printed circuit board in opposite to respective contact portions of the plurality of movable contacts, and a plurality of operating members corresponding to the plurality of movable contacts respectively. The recording medium may have a disc shape which is rotated in the recording and/or reproducing system, and the system may further comprise a motor unit having a motor for driving and rotating the recording medium and the motor may have a yoke jointly served as a chassis. The yoke may be a yoke of a stator coil for driving rotor magnet.

In the second aspect of the present invention, a recording and/or reproducing system comprises:

a holder which has a portion for accepting a recording medium from a first direction and which can move between a first position and a second position ahead of the first position in the first direction, and between the second position and a position where recording and/or reproducing is performed in and/or from the recording medium in a second direction which is inclined with respect to the first direction;

a first biasing member for biasing the holder in the first direction;

a first holding member for holding the holder at a first position and at a second position against the biasing member;

a coupling member coupled to the holder and moving to a third position corresponding to the recording and/or reproducing position in a direction including the second direction during a movement of the holder from the first position to the second position, and for moving the holder from the second position to the recording and/or reproducing position;

a second biasing member for biasing the coupling member in a direction including the second direction;

a second holding member for holding the coupling member at a position where the movement of the coupling member starts and at the third position against the second biasing member;

a detecting member for detecting that the recording medium is inserted into a holder at the first position;

a drive member for driving the first and the second holding members in response to the detection by the detecting member and performing movement of the holder to the second position and movement of the coupling member to the third position; and a drive control member for detecting loading of the recording medium and for controlling the drive member.

Here, the first biasing member may have a spring, the holder may have a tray that is always biased in the first direction by the spring and a guide member attached to the tray so that the guide member can be raised and lowered, the biasing member may have a link arm that couples the guide member with a base side of the system and is coupled to a long hole formed on both sides of the tray through a pin, and a spring for biasing the link arm in the second direction, the coupling member may have a slidable linkage plate to be linked to a pin at an intermediate position of the link arm, the first and second supporting members may have first and second cams, respectively, the drive member may have a worm wheel on which the first and second cams are formed, and a worm that engages with the worm wheel and a motor for rotating the worm, the detecting member may have a switch disposed at a rear of the tray, and the drive control member may have a home position detecting switch and a loading completion switch which are activated by the worm wheel to control the rotation of the worm wheel.

In the third aspect of the present invention, a recording and/or reproducing system comprises:

a recording and/or reproducing means for performing recording and/or reproducing in a recording medium housed in a cassette having an opening for exposing a portion of the recording medium and a shutter for opening and closing the opening; and a releasing member having a pin having a notch portion for releasing the opening by acting on the shutter In the fourth aspect of the present invention, a recoring and/or reproducing system comprises:

a holder for holding a cassette housing a recording medium;

a means for performing recording and/or reproducing in and/or from the recording medium;

a leaf spring member for generating a biasing force for holding the cassette in the holder; and a member which is a claw-shaped member disposed on the leaf spring member or the holder and which fixes the leaf spring member to the holder by bending.

In the fifth aspect of the present invention, a recording and/or reproducing system comprises:

a head for performing recording and/or reproducing in and/or from a recording medium;

a carriage for mounting the head;

a guide shaft for guiding the carriage in a predetermined direction with respect to the recording medium;

an engaging member for slidably engaging with the guide shaft disposed on the carriage, the engaging member having:

a first bearing fixed to the carriage; and a second bearing which is attached to the carriage after adjusting an aligment with reference to the first bearing.

Here, the carriage may have a first member for supporting the first bearing and second members for supporting adjustably an attachment position of the second bearing, which is adhered and fixed to the second portion after the adjustment of alignment.

In the sixth aspect of the present invention, a recording and/or reproducing system comprises:

a head for performing recording and/or reproducing on and/or from a recording medium;

a carriage for mounting the head;

a guide shaft for guiding the carriage in a predetermined direction with respect to the recording medium; and a synthetic resin holding member formed by outsert molding and mounted to a chassis for supporting the guide shaft.

In the seventh aspect of the present invention, a position adjusting mechanism comprises:

a position adjusting member for adjusting a position of a member to be mounted and fixed to a chassis after the position adjustment, the position adjusting member being formed by outsert molding of a synthetic resin material and mounted to a chassis base plate.

In the eigth aspect of the present invention, a switch mechanism comprises:

a switch contact member;

an operating member for operating the contact member; and a supporting member for supporting the operating member, the supporting member being formed by outsert molding of a synthetic resin material and attached to a base plate.

In the ninth aspect of the present invention, a switch mechanism comprises:

a switch mechanism which has an electrically conductive leaf spring member having a plurality of movable contact members and a mount portion to be mounted to a printed circuit board;

a plurality of fixed contacts disposed on the printed circuit board in opposite to respective contact portions of the plurality of movable contacts; and a plurality of operating members corresponding to the plurality of movable contacts respectively.

In the tenth aspect of the present invention, a motor unit comprises:

a rotating shaft disposed vertically on a chassis on a flat plate; and a yoke which serves jointly as the chassis.

Here, the yoke may be a yoke of a stator coil for during rotor magnet.

The above and other objects, effects, features and advantages of the present invention will become more apparent from the following description of preferred embodiments thereof taken in conjunction with the accompanying drawings.

BRIEF DESCRIPTION OF THE DRAWINGS

FIGS. 9A and 9B are a plan view and a side view respectively showing an arrangement of a switch mechanism including the switch shown in FIG. 8;

FIGS. 11A and 11B are an exploded perspective view and a cross-sectional view respectively showing an arrangement of an operating button on the system shown in FIG. 1;

FIGS. 12A and 12B are an exploded perspective view and a cross-sectional view respectively showing another arrangement of the operating button;

FIGS. 15A and 15B are respectively a plan view and a cross-sectional view along a line (b)—(b) showing an arrangement of an attaching member on a chassis for attaching a carriage member guide bar;

FIGS. 15C and 15D are respectively a plan view and a cross-sectional view along a line (c)—(c) showing an attaching member with a guide bar attached;

DETAILED DESCRIPTION OF PREFERRED EMBODIMENTS

An explanation will first be made with reference to FIGS. 2A and 2B of an outline of a cassette used in the present embodiment.

Figure 2A:
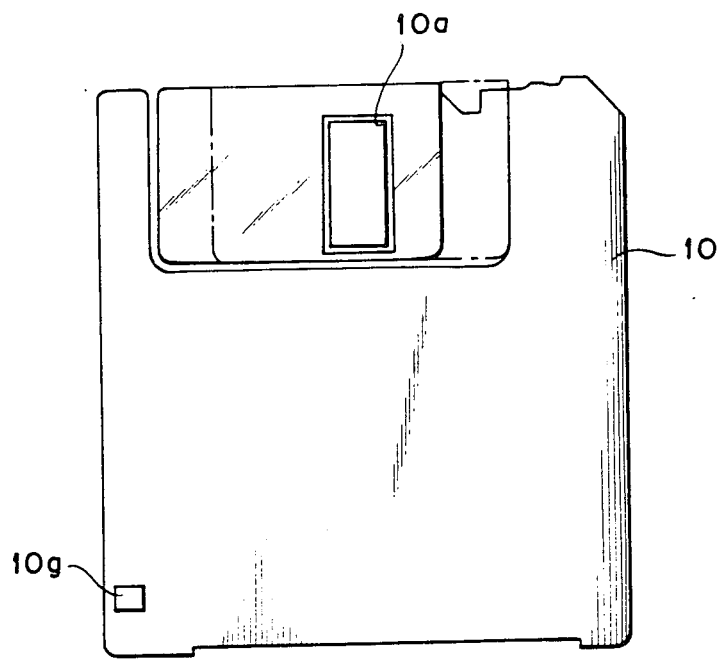
FIGS. 2A and 2B are plan views showing respectively the front and back of a cassette which can be used in the system shown in FIG. 1.
Figure 2B:
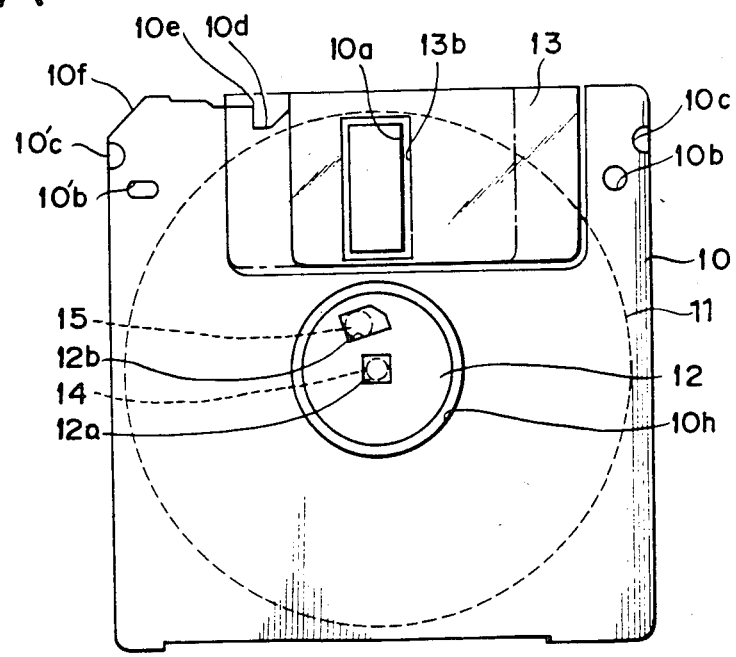

Reference numeral 10 in FIGS. 2A and 2B denotes a cassette formed into a flat rectangular case by integrating a pair of upper and lower cassette halves formed from plastic or a similar material and housing a disc-shaped magnetic recording medium.

Along an outer edge of this cassette 10 on an upper and a lower surface in a loading direction is formed a rectangular notch. A shutter 13 is disposed slidably in this notch.

The cross-section of the shutter 13 is formed in a U-shape. The shutter 13 is biased towards the position shown in the drawing by a dash and dotted line by a spring (not shown). At that position, an opening 13b on the shutter 13 is displaced beyond a position opposite a head window 10a so that the head window 10a is closed.

Furthermore, a cut-away portion 10f for detecting whether or not the cassette has been loaded correctly is formed at an inclination on a corner portion in the loading direction. A write protect detection portion 10g is disposed near an edge of the cassette 10 at its rear with respect to the direction of loading.

On the other hand, an opening 10h is formed in a center of an opposite side of the cassette 10. In this opening 10h is positioned a center hub 12 that is fixed to a central portion of a magnetic disc 11 housed in the cassette by, for example, a double-sided adhesive tape or adhesive mass.

This center hub 12 has a spindle hole 12a and a drive pin hole 12b that link respectively with a rotating shaft (spindle) 14 and a drive pin 15 of a motor not shown. Reference numeral 10d denotes a groove that couples with a shutter pin (described below) and reference numeral 10e a corner portion of the groove 10d. Reference numerals 10b and 10b' denote holes for positioning the cassette 10 inside the unit. Reference numerals 10c and 10'c are spare holes for other functions such as auto-eject.

Figure 1:
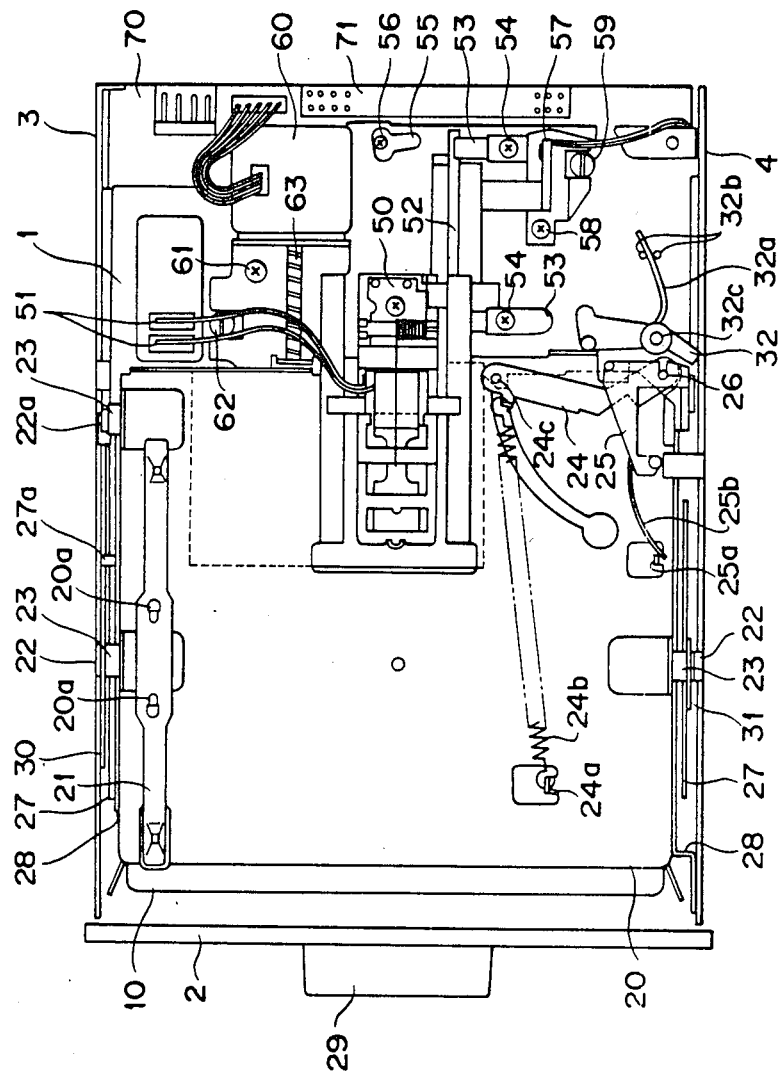
FIG. 1 is a plan view showing an embodiment of a recording and/or reproducing system according to the present invention.
Figure 3A:
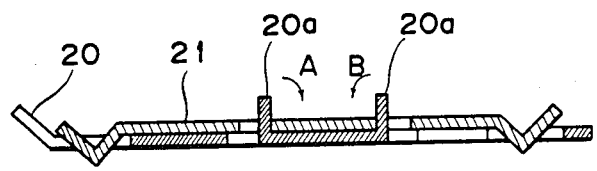
FIGS. 3A and 3B are cross-sectional views explaining a method for attaching a cassette holding spring plate to a cassette holder.
Figure 3B:
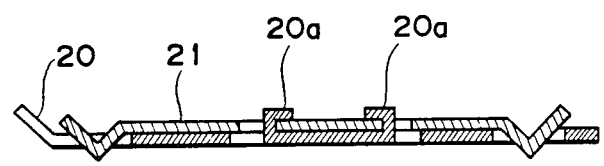

FIG. 1 is a plan view showing the present embodiment. In FIG. 1, reference numeral 10 denotes a cassette, reference numeral 20 a cassette holder for supporting the cassette 10 and reference numeral 20a a fastener formed by cutting and raising a portion of the ceiling of the cassette holder 20, and having two pieces in a pair. Reference numeral 21 denotes a cassette pressing leaf spring for applying a suitable pressing force on the cassette 10. As shown in FIGS. 3A and 3B, the leaf spring 21 is fixed to the cassette holder 20 by bending the two fasteners 20a over the leaf spring 21 in a direction of arrows A and B. Furthermore, the leaf spring 21 is attached to the cassette holder 20 by disposing a fastener on a side of the leaf spring 21 opposite this.

In this manner, the leaf spring 21 is attached to the cassette holder 20 by bending a claw disposed integrally with the leaf spring 21 or the cassette holder 20 so that an operation for attaching the cassette pressing leaf spring 21 to the cassette holder 20 is simplified, thereby allowing for a lower manufacturing cost.

Figure 4:
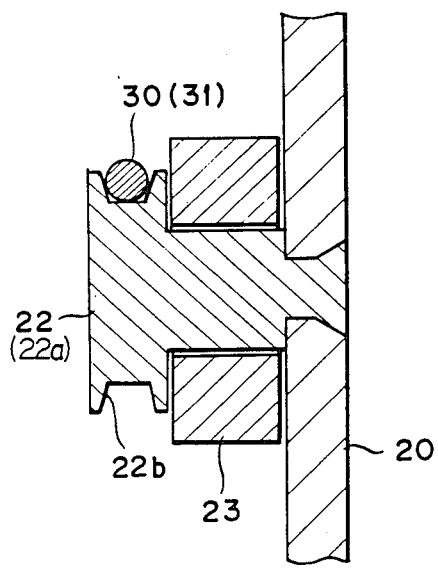
FIG. 4 is a cross-sectional view showing an attachment portion of a cassette holder slider roller.

Reference numerals 22 and 22a denote respectively roller shafts disposed so that rollers 23 can rotate freely in the cassette holder 20. As shown in FIG. 4, a groove 22b is formed in the two roller shafts 22 and 22a so that a spring 30 and a spring 31 do not rub against the roller 23.

Figure 5:
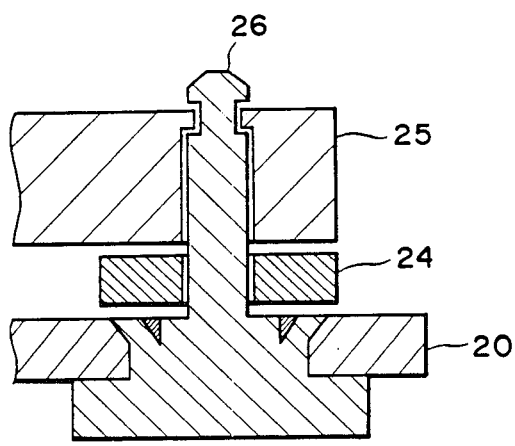
FIG. 5 is a cross-sectional view showing an attachment portion of a cassette holder shutter lever and FIG. 6 is a plan view explaining a coupling condition of a shutter pin and a cassette and that shutter.

As shown in FIG. 5, a shutter lever 24 and a latch 25 are supported rotatably by a shaft 26 fixed on the cassette holder 20. The shutter lever 24 holds tense an end of a shutter spring 24b fixed at its other end to a spring hook 24a formed by cutting and raising a portion of the cassette 20 (see FIG. 1).

The latch 25 is a molded member. An edge of a thin flat member 25b formed integrally with the latch 25 contacts with a hook 25a formed by cutting and raising a portion of the cassette holder 20 so that the thin flat member 25b is bent like a bow. A shutter pin 24c is disposed below an edge of the shutter lever 24.

Figure 6:
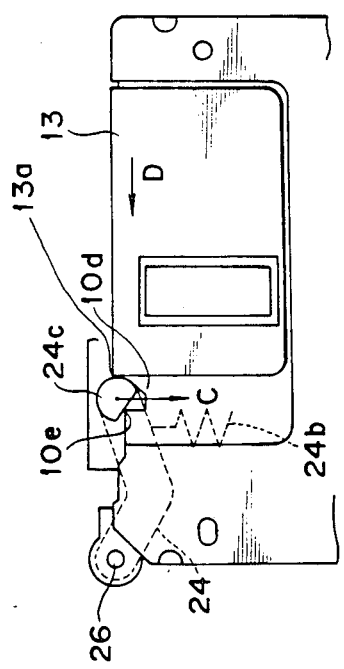

As shown in FIG. 6, one portion of the cylindrical surface of the shutter pin 24c is formed into a flat plane so that when the shutter 13 is fully open, the whole of the shutter pin 24c does not enter into the shutter V-shaped groove 10d, but only a corner portion 10e and a flat portion of the shutter pin 24c make contact.

A suitable size of the diameter of the shutter pin 24c is selected so that when the above-mentioned contact is made, the center of the shutter pin 24c is positioned towards the inside of the edge surface 13a of the shutter 13, thereby preventing the shutter pin 24c from slipping out of the shutter V-shaped groove 10d even when it is subject to a force (in the direction of an arrow D) of closing the shutter 13. In FIG. 6, the shutter pin 24c is biased in the direction of the arrow C by the shutter spring 24b.

In this manner, it is possible to open securely a cassette opening with an action on a shutter fitted to a cassette by disposing a shutter pin 24c with one portion cut away. Moreover, this arrangement performs smoothly offering no hindrance even when ejecting a cassette.

In FIG. 1, reference numeral 27 denote side plates, and reference numeral 28 a lift plate having a U-shape. Reference numeral 27a denotes a restraining member formed by cutting and raising a portion of the side plate. This restraining member prevents a spring 30 from permanent deformation by being bent abnormally by mistake in the direction of an arrow E in FIG. 7.

Figure 8:
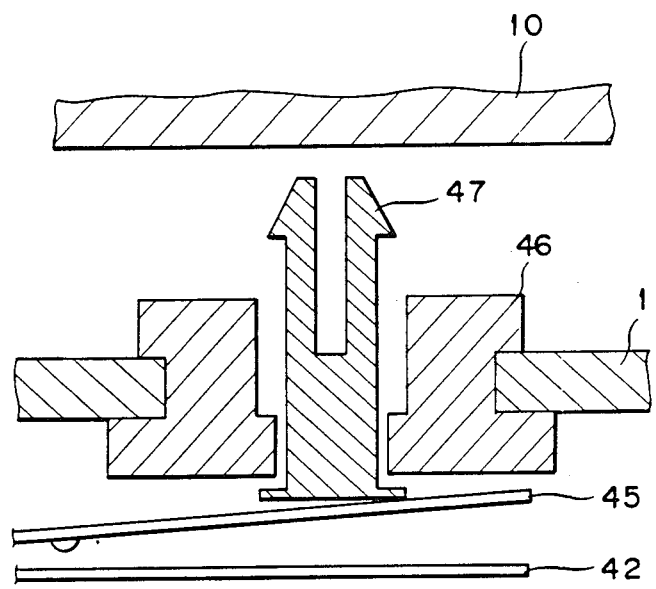
FIG. 8 is a cross-sectional view showing an arrangement of a detection switch for detecting loading of a cassette.
Figure 7:
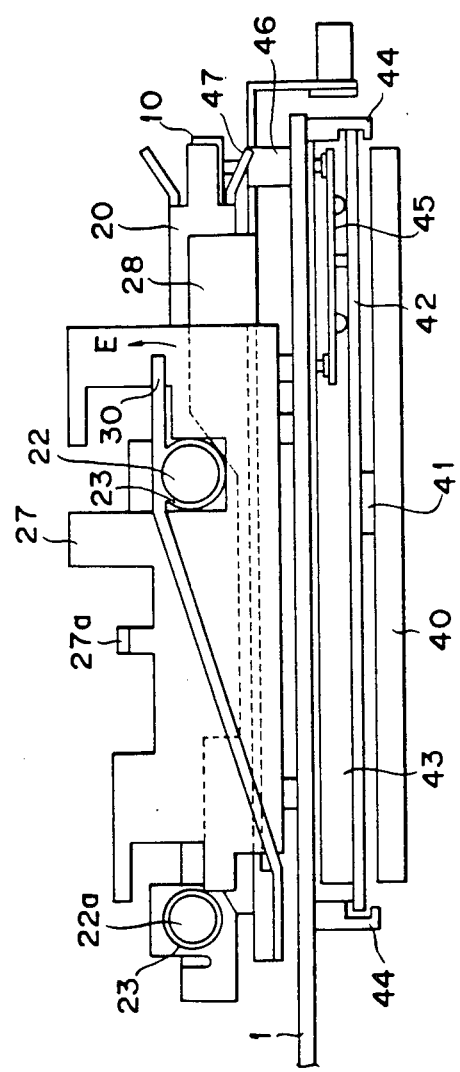
FIG. 7 is a cross-sectional view showing an exploded portion of the system shown in FIG. 1.

In FIG. 7, the reference numeral 40 denotes a spindle motor rotor, reference numeral 41 a rotor shaft, reference numeral 42 a spindle motor circuit board, reference numeral 43 a motor coil and reference numeral 44 a hook on the chassis 1 for supporting the spindle motor circuit board made from a synthetic resin material by extrusion forming (outsert molding). Reference numeral 45 denotes a switch lever, reference numeral 46 a sleeve on the chassis 1 formed by outsert molding and reference numeral 47 a switch knob for operating the switch lever 45. FIG. 8 shows an exploded cross-sectional view of these parts. The switch knob 47 is pressed up by a spring force of the switch lever 45, and moves up and down according to the up and down motion of the cassette 10.

In this manner, the sleeve supporting the switch knob 47 as an operating member of the switch lever 45 is formed by outsert molding of a synthetic resin material and attached to the base plate (the chassis 1) so that the switch mechanism is arranged on the base plate. In this case, assembly operations are simplified particularly for attachment of the above-mentioned support member to the base plate, thereby allowing for large reductions in costs due to automation.

These members constitute a cassette detection switch. Other switches such as a write-protect detection switch and an ejection complete detection switch have the same arrangement.

In the present embodiment, the above-mentioned three switches are arranged integrally as shown in FIGS. 9A and 9B. That is, in FIGS. 9A and 9B the switch lever 45 has three arm portions 45a, 45b and 45c, for each one of the above-mentioned switches. These arm portions are formed from an electrically conductive elastic leaf spring. In the center of these arm portions are downward bent portions 45d and 45e having a claw portion on their ends which pass through slits formed on the circuit board 42 and are bent on the back side so as to attach to the circuit board 42. Furthermore, these arm portions are connected to the grounded point of the circuit board's circuits.

The arm portions 45a, 45b and 45c have contacts 45'a, 45'b and 45'c respectively which are disposed opposite fixed contacts 42'a, 42'b and 42'c on the circuit board 42 respectively. Moreover, knobs 47a, 47b and 47c are disposed respectively with respect to each of the arm portions 45a, 45b and 45c. These knobs 47a, 47b and 47c are supported by sleeves formed on the chassis 1 by outsert molding. In FIG. 9B, reference numerals 42a, 42b and 42c denote conductor patterns for use as signal lines respectively, and reference numeral 42d denotes a conductor pattern for grounding.

The three switches have pairs of contacts 45'a and 42'a, 45'b and 42'b and 45'c and 42'c. Consequently, the knobs 47a, 47b and 47c move up or down depending on whether or not there is a cassette, whether or not there is a write-protect and whether or not ejection is completed, making contact or not making contact with each of the contacts.

In this manner, movable contact members (arm portions 45a, 45b and 45c are arranged of electrically conductive leaf spring Furthermore, in their substantially center portion they fix and support these and connect to a predetermined electrical potential. In the vicinity of an area corresponding to the free end of the leaf spring are disposed fixed contacts 42'a, 42'b and 42'c connected respectively to predetermined electrical potentials. Moreover, operating members 47a, 47b and 47c are disposed respectively in the vicinity of an area corresponding to the free end so that when a plurality of switches is arranged, it is possible to reduce the number of parts and to provide a switch arrangement offering superior performance of both workability and costs.

Figure 10:
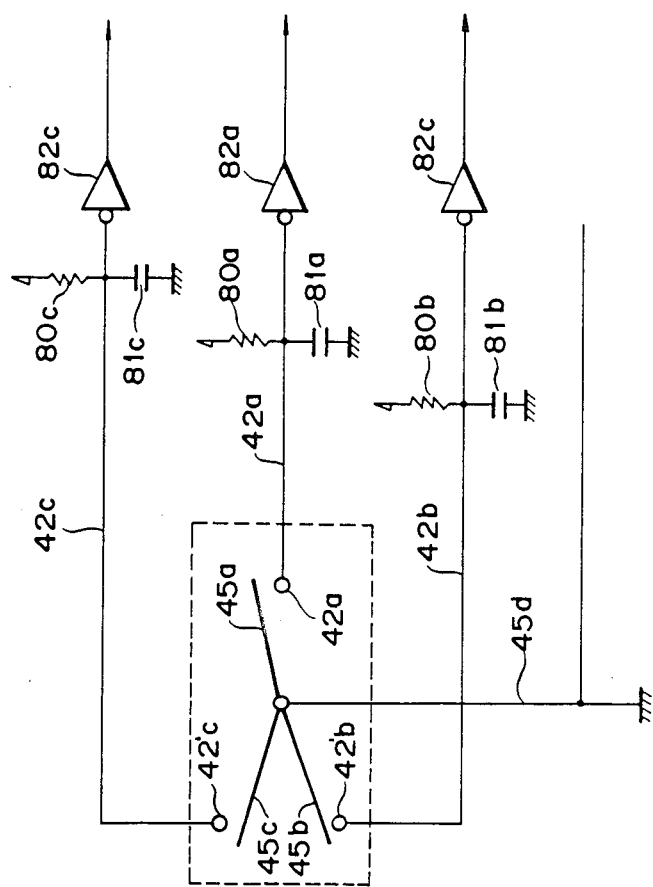
FIG. 10 is a circuit diagram showing an arrangement of a detection circuit linked to the switch mechanism shown in FIGS. 9A and 9B.

FIG. 10 shows the principal circuits including the above-mentioned three switches. Reference numeral 80a, 80b an 80c denotes resistors for pull up, reference numerals 81a, 81b and 81c capacitors and reference numerals 82a, 82b and 82c inverters from which are output the on or off condition of each switch as a high or low signal.

In FIG. 1, reference numeral 29 denotes a button which an operator pushes to remove a loaded cassette. The button 29 is fixed to a lift plate 28. FIGS. 11A and 11B show a method of fixing that button. That is, at the same time that as a groove on an ear 29a of the button 29 slides into a groove 28a of the lift plate 28, a protrusion 28b protruding from the lift plate 28 slides into and couples with a hollowed groove 29b on the button 29. FIGS. 12A and 12B show a variant example of attaching the operating button 29. Instead of the protrusion 28b, the lift plate 28 has a window 28c. A notch portion 29c formed on the button 29 fits into and couples with this window 28c.

In FIG. 1, reference numeral 32 denotes a molded eject lever, reference numeral 32a a thin flat member formed integrally with the eject lever 32 and reference numeral 32b a protrusion formed on the chassis 1 which supports the thin flat member 32a. The eject lever 32 is supported rotatably by a shaft 32c formed on the chassis 1.

Figure 13:
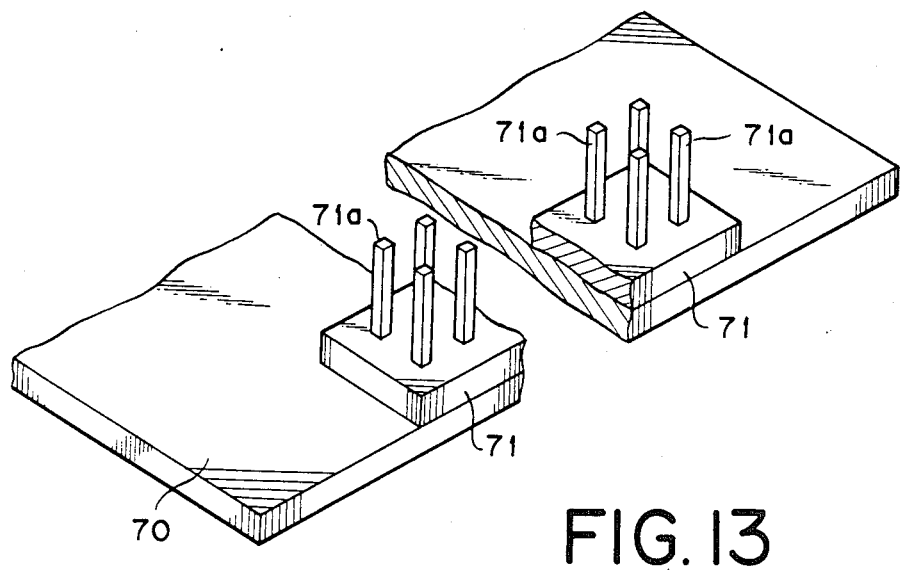
FIG. 13 is a perspective view showing an arrangement of a connector portion of an electrical circuit in the system shown in FIG. 1.

In FIG. 1, reference numeral 50 denotes a head carriage member having a magnetic head, a head pressing spring and a head support, reference numeral 51 a head cable, reference numeral 52 a guide bar which acts as a guide for the head carriage member 50, reference numerals 53 and 53 guide bar holders that fix the guide bar 52 to the chassis 1, reference numerals 54 and 54 fixing screws for the guide bar holders 53, reference numerals 55 and 56 a stopper (hereinafter referred to as the "0 position stopper") for holding the carriage member 50 in a position corresponding to the number "0" track on the magnetic disc 11 (hereinafter referred to as track "0") and a fixing screw for that stopper, reference numerals 57 and 58 a sensor for detecting the track "0" and a fixing screw for that sensor, reference numeral 59 an adjustment cam for adjusting and moving an attachment position of the sensor 57, reference numerals 60 and 61 a step motor and a fixing screw for that motor, reference numeral 62 an eccentric joggle for adjusting and moving the attachment position of the step motor 60, reference numeral 63 a lead screw, reference numeral 70 an electrical circuit board and reference numeral 71 an I/O connector fixed on the electrical circuit board 70. FIG. 13 shows details of this connector. That is, a connector pin 71a of the connector 71 is disposed vertically with respect to the board 70, allowing for a more compact size compared to conventional sideways pins.

Reference numeral 2 denotes a bezel. Reference numerals 3 and 4 are attaching members both fixed to the chassis 1.

Figure 14:
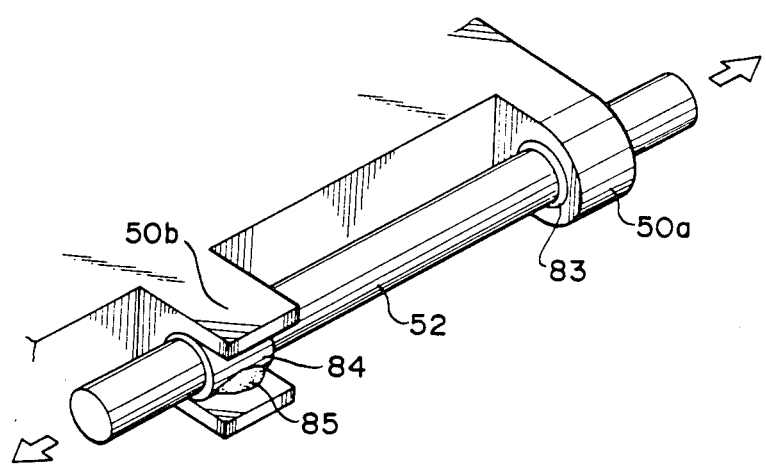
FIG. 14 is a perspective view showing an arrangement of a bearing portion of a carriage member for mounting a magnetic head.

An explanation will be made here of the details of the bearing portion on a side of the carriage member 50 facing the carriage guide bar 52 with reference to FIG. 14.

The carriage member 50 has sliders 50a and 50b with respect to the bar 52. Bearings 83 and 84 are disposed on these. The guide bar 52 is inserted into the bearings 83 and 84 disposed in the sliders 50a and 50b in the following manner. First, the bearing 83 is pressed into the slider 50a and fixed and the bearing 84 is loosely inserted into the slider. Next, a standard guide bar that is slightly fatter than the guide bar 52 is inserted into the bearings 83 and 84 so that the guide bar 52 will pass smoothly between the bearings 83 and 84. At this time, using the bearing 83 which has been inserted and fixed as standard, the bearing 84 which has been inserted loosely is moved in the direction which improves the passage of the standard guide bar. After the bearing 84 has been positioned, it is fixed to the slider 50b with an adhesive 85.

Then, when the bearing 84 has been fixed securely with the adhesive 85, the regular guide bar 52 is passed through the bearings and assembled so that passage through the bearings 83 and 84 always occurs under the same passage conditions.

It should be noticed that to make the above adjustments possible, the slider 50a has a cylinder portion with a round hole, whereas the slider 50b is formed with a U-shaped hole.

The carriage member 50 has a plurality of slider bearings for the guide bar 52. At this time, one of these bearings is determined as standard and the remaining bearings are fixed to the carriage member 50 after they have been aligned. This arrangement means that the alignment between the bushings on the plurality of sliders for the carriage guide shaft of the head carriage, that is between the insertion holes of the slider bearings need not be maintained precisely, so that the attitude of the head towards the recording medium can be maintained with precision.

In the present embodiment, a carriage guide bar 52 made by outsert forming is positioned, thereby forming a pressing plastic functional member.

In conventional arrangements, secondary working is performed on an aluminum diecast base or the like and a guide bar mounted on a precision portion. And the guide bar is screw locked by a pressed spring thin plate. In contrast to this, in the present embodiment a guide bar formed by outset forming is worked in a single step for both the positioning portion and the guide bar holding portion so that secondary working can be disposed of, and the number of parts can be reduced, thereby allowing for large reductions in costs.

An explanation will now be made of that process with reference to FIGS. 15A–15D. FIG. 15A shows a chassis immediately after outsert forming Reference numeral 53 denotes a holding member. A shaft portion 53a of that holding member 53 is rotatably outsert formed on the chassis 1. Reference numeral 86 denotes a guide-bar positioning supporting member. A tap hole 87 is formed on the chassis in an opposite position to this member 86. Reference numeral 88 denotes a member for fixing the member 86 to the chassis 1, and reference numeral 89 a screw.

FIG. 15B shows a cross-section of the arrangement in FIG. 15A along a line (b)—(b). FIG. 15C shows a condition when the guide-bar 52 is fixed.

After the guide-bar 52 has been mounted on the supporting member 86, holding member 53 is rotated so that the force generated by the flexion of an end of the holding member 53 presses on the guide-bar 52, and the holding member 53 is fixed by the screw 89.

FIG. 15D shows a cross section of the arrangement in FIG. 15C along a line (d)—(d). A supporting member 86 adjusts the guide-bar 52 in a vertical direction. Accuracy of the position in the horizontal direction is adjusted by an edge 1b protruding from an opening 1a on the chassis 1.

In the present embodiment, a 0-position stopper 55 on the carriage 50 is also formed by outsert forming, and can be adjusted. In conventional arrangements a 0-position stopper has had a separately assembled member that lead to disadvantages of cost and assembly. In the present embodiment, however, forming the 0-position stopper by outsert forming has simplified adjustments and has made it possible to reduce costs.

This 0-position stopper will be explained with reference to FIGS. 16A and 16B.

Figure 16A:
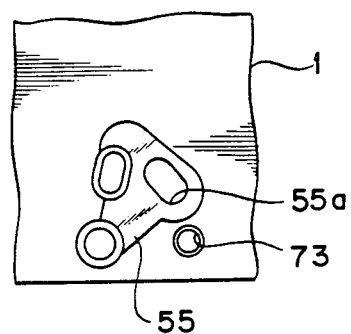
FIGS. 16A and 16B are plan views showing attachment and adjustment of a stopper on a chassis for stopping a carriage member in a position corresponding to a number "0" track on a magnetic disc.

As shown in FIG. 16A, a 0-position stopper 55 formed by outsert forming is rotatably attached to the chassis 1. One portion of the stopper is formed into a long hole 55a. Reference numeral 73 denotes a screw hole tap worked into the chassis 1 for coupling with the fixing screw 56 on the stopper 55 through the long hole 55a on the stopper 55.

Figure 16B:
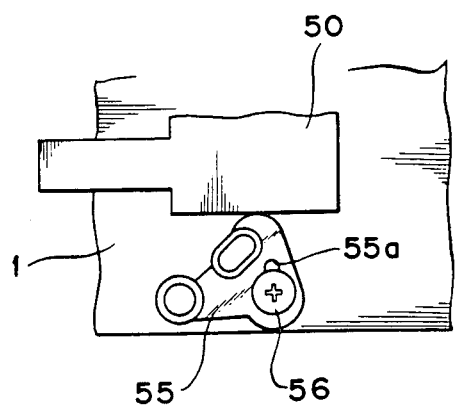

FIG. 16B shows a fixed condition as a 0-position stopper for the head carriage 50. Adjustment is performed by the long hole 55a.

In the present embodiment, adjustment of a positions of the carriage drive step motor, a lead screw and a track "0" detection sensor is performed by an eccentric joggle disposed on a base by outsert forming.

In conventional arrangements, the above-mentioned adjustments required use either of a separate member or of a tool, thereby creating disadvantages of costs. In the present embodiment, however, forming of an eccentric joggle by outsert forming facilitates these adjustments, and allows for reduction of costs.

An explanation will be made of this with reference to FIGS. 17–19.

Figure 17A:
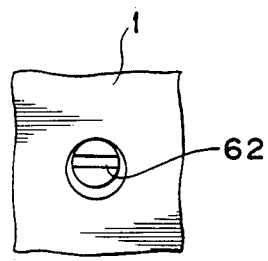
FIGS. 17A and 17B are a plan view and a cross-sectional . view respectively showing an arrangement of a position adjustment number disposed on a chassis.
Figure 17B:
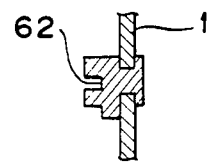
Figure 18:
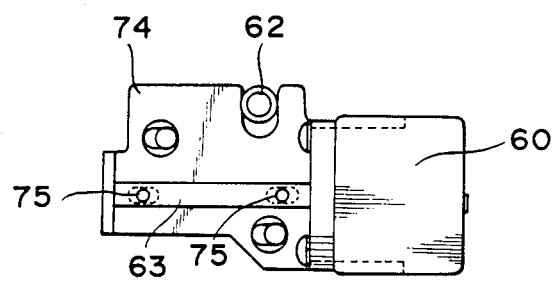
FIG. 18 is a plan view showing adjustment of a position of a carriage member transport mechanism using a position adjustment member.

FIG. 17A shows an eccentric joggle 62 formed on the chassis 1 by outsert forming. FIG. 17B shows a cross section of that joggle FIG. 18 shows an example in which this arrangement is used to adjust the position in an a front-to-back direction of a carriage drive step motor 60 and a lead screw 63. In FIG. 18, reference numeral 60 denotes a step motor, reference numeral 74 a press-worked holder, reference numeral 75 a positioning joggle formed by outsert forming and reference numeral 63 a lead screw.

Figure 19:
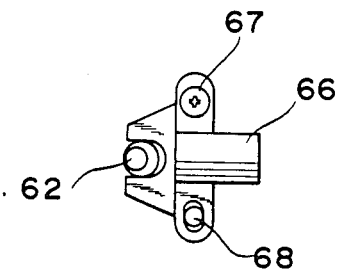
FIG. 19 is a plan view showing adjustment of a position of a photo-coupler for detecting a number "0" track on a magnetic disc using a position adjustment member.

FIG. 19 shows an example of using an eccentric joggle for adjusting the position of a track "0" detecting sensor, such as a photo-coupler. In FIG. 19, reference numeral 66 denotes a photo coupler, reference numeral 67 a fixing screw, reference numeral 68 a positioning joggle and reference numeral 62 an eccentric joggle.

This arrangement uses a member formed from a synthetic resin material by outsert molding and attached to the chassis base plate to adjust the positions of members which have been attached and fixed to the chassis after positioning. The arrangement thereby simplifies considerably the attachment of a position adjusting member for members requiring position adjustment to the chassis base plate, and can make a large contribution to automation and cost reduction.

Next, an explanation will be made of a motor for a disc drive used in the present embodiment with reference to FIG. 20.

Figure 20:
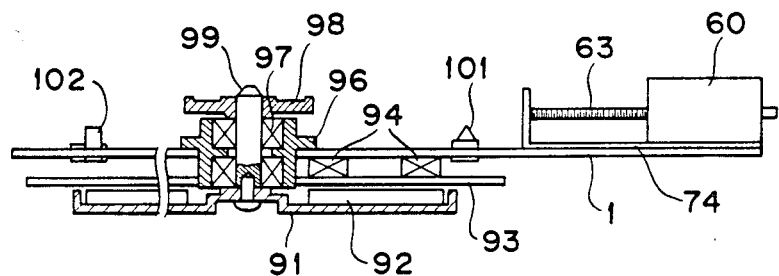
FIG. 20 is a cross-sectional view showing an arrangement of a magnetic disc drive motor.

In FIG. 20, reference numeral 91 denotes a rotor yoke inside of which is mounted a permanent magnet 92. Reference numeral 93 denotes a printed circuit board for mounting a control circuit and a drive coil 94 of a direct drive motor (DD motor). In this arrangement, the chassis 1 is made from silicon steel plate or the like, and is used jointly as a stator yoke for the DD motor.

In this manner, by using the chassis of the main unit jointly as the stator yoke for the DD motor, the number of steps for installing the DD motor can be reduced and the accuracy of positioning can be improved. Furthermore, this arrangement contributes to keeping a system using this type of drive mechanism compact and lightweight. Moreover, since the arrangement is simple, it can be easily applied to automated assembly.

Reference numeral 96 denotes a housing, reference numeral 97 a bearing, reference numeral 98 a flange, reference numeral 99 a rotating shaft, reference numeral 101 a cassette positioning pin attached to the chassis 1 which includes the stator yoke, and reference numeral 102 a cassette height positioning pin.

Figure 21:
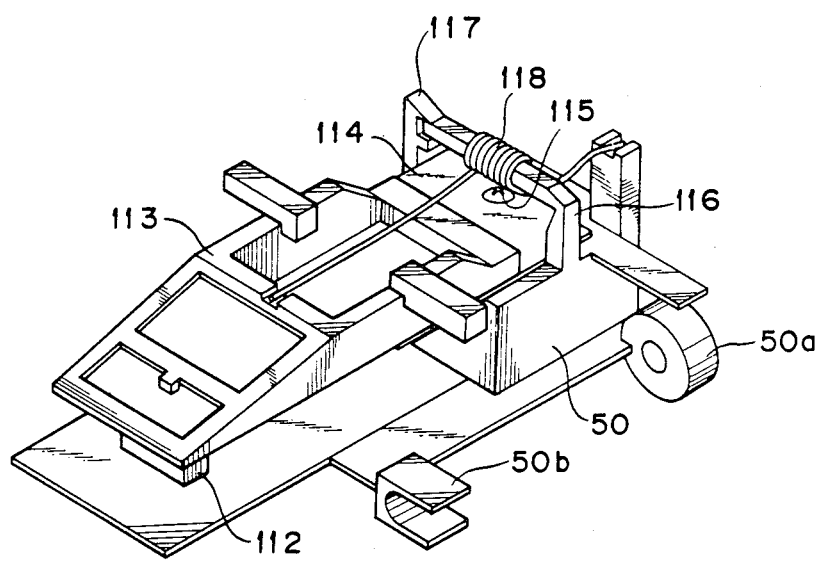
FIG. 21 is a perspective view showing an arrangement of a magnetic head assembly including a magnetic head and a carriage member.

In FIG. 21, reference numeral 50 denotes a head carriage member mounting a 0 side head 112, and formed from a synthetic resin such as polycarbonate or the like. Reference numeral 113 denotes a head arm mounting an 1 side head (not shown). The head arm 113 and the head carriage 50 are coupled by a screw 115 through a leaf spring 114 formed integrally with the head arm 113.

Furthermore, reference numeral 116 denotes a spring attaching arm for attaching a head arm spring 118 that generates a force (head pressure) for pressing an 1 side head on to a magnetic disc 11 which is a recording medium. Furthermore, reference numeral 117 denotes a hook arm for catching the spring attaching arm 116. The spring attaching arm 116 and the hook arm 117 are formed integrally with the head carriage 50.

Figure 22A:
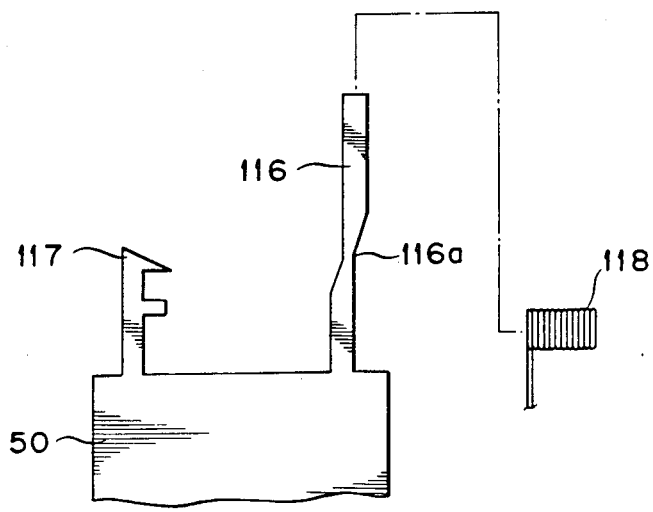
FIG. 22A and 22B are drawings explaining a procedure for attaching a head arm spring for biasing a magnetic head towards a magnetic disc to a magnetic head assembly.
Figure 22B:
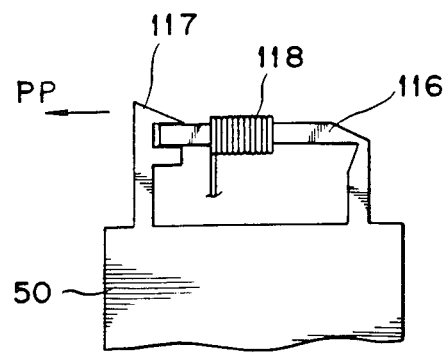

FIGS. 22A and 22B show details of the above arrangement. FIG. 22A shows the condition before attachment of a spring 118. FIG. 22B shows the condition with the spring 118 attached.

In FIG. 22B, the spring 118 is inserted into the spring attaching arm head arm spring 116, then bent at a hinged portion 116a as shown in the drawing. The hook arm 117 is then deflected slightly in the direction indicated by the arrow pp so that it catches the spring attaching arm 116.

The hook arm 117 is returned to its original condition by the spring force of the molded member so that the spring attaching arm 116 remains in the condition shown in FIG. 22B, thereby preventing the head arm spring 118 from slipping off.

This arrangement makes it possible to attach the spring without using a separate member for supporting the spring as in conventional arrangements, thereby providing excellent workability and making a large contribution to cost reduction.

Next, an explanation will be made of a system having the above arrangement, in particular an operation of a mechanism for loading and ejecting a cassette, with reference to FIGS. 23A–23L and FIGS. 24A and 24B.

Figure 23A:
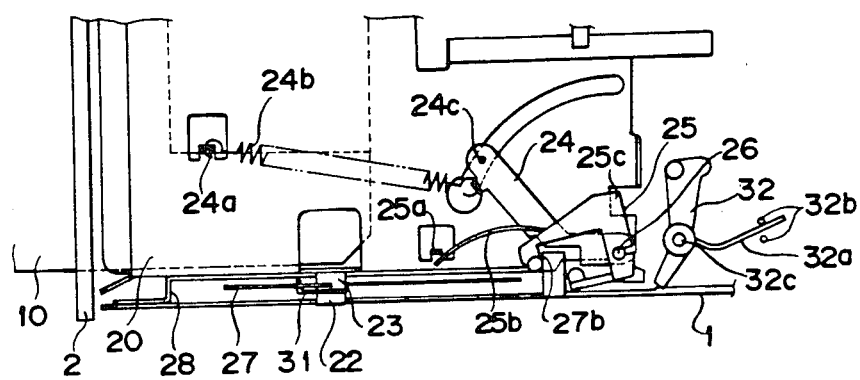
FIGS. 23A to 23L are drawings explaining an operation of a cassette loading and ejection mechanism in the recording and/or reproducing system shown in FIG. 1.
Figure 23B:
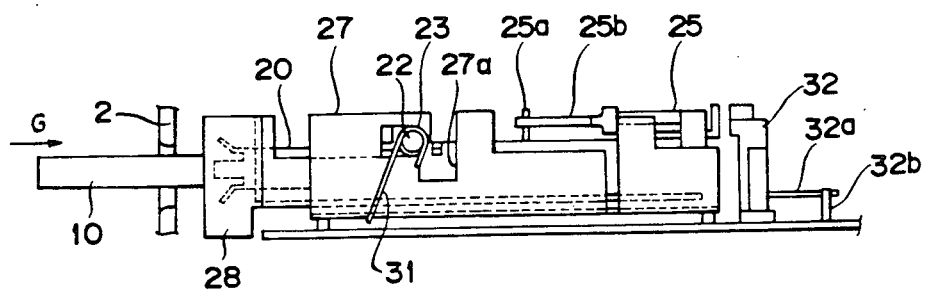

FIGS. 23A a 23B show a cassette loading standby condition. In this condition, a cassette 10 can be inserted by sliding in the direction of an arrow G. In this condition, a shutter lever 24, latch 25 and eject lever 32 are positioned in their respective origin positions by a spring force.

Figure 23C:
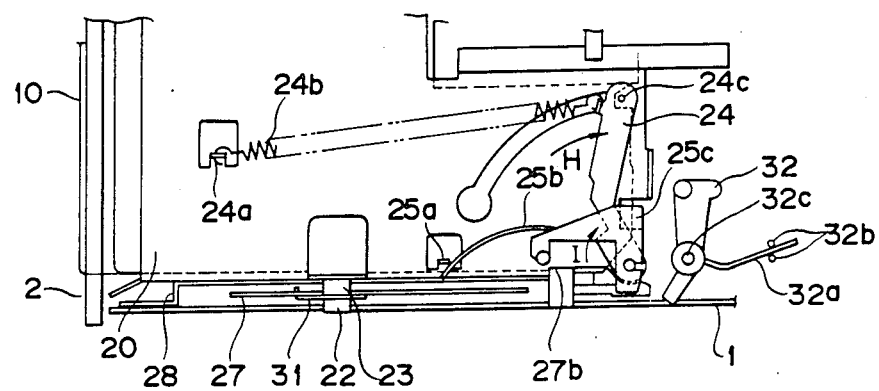

When the cassette 10 is slid further, a shutter pin 24c contacts a shutter 13 so that the shutter 13 opens in response to the rotation of the shutter lever 24 (in the direction of an arrow H in FIG. 23C. At the same time, the front edge of the cassette 10 contacts a latch pin portion 25C formed on the bottom surface of the latch 25. When the cassette 10 is slid even further, the latch 25 rotates in the direction of an arrow I in FIG. 23C.

Figure 23D:
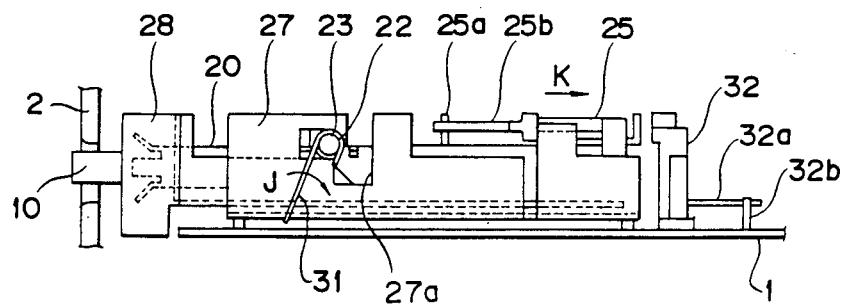

When the rounded portion of the front edge of the latch 25 disengages from a corner portion 27b of a bent portion of the side plate 27, the force (in the direction of an arrow J) of a spring 31 (a torsion-bar spring loaded in a counter-clockwise direction with respect to the drawing) slides a cassette holder 20 in the direction of an arrow K as shown in FIG. 23D.

A portion of the rolling surface of a roller 23 on the side plate 27 is cut away. When the cassette holder 20 slides and the roller 23 rotates as far as this cut-away portion 27a, the cassette holder 20 is lowered in the direction of an arrow L by the force of the spring 31.

Figure 23E:
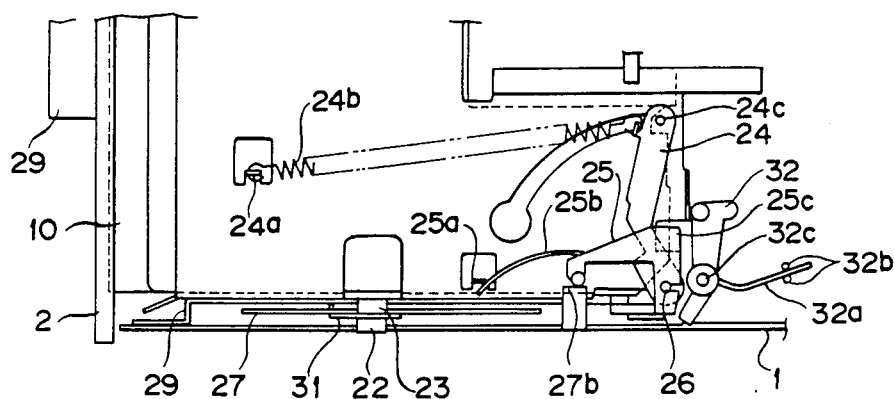
Figure 23F:
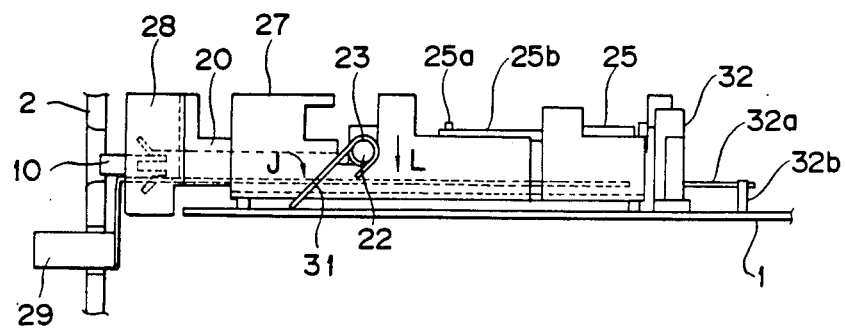

At this time, the cassette 10 is being restricted in an up-and-down direction by the cassette holder 20 so that it is lowered together with the cassette holder 20, thereby completing loading of the cassette 10 (FIG. 23E and FIG. 23F).

Figure 23G:
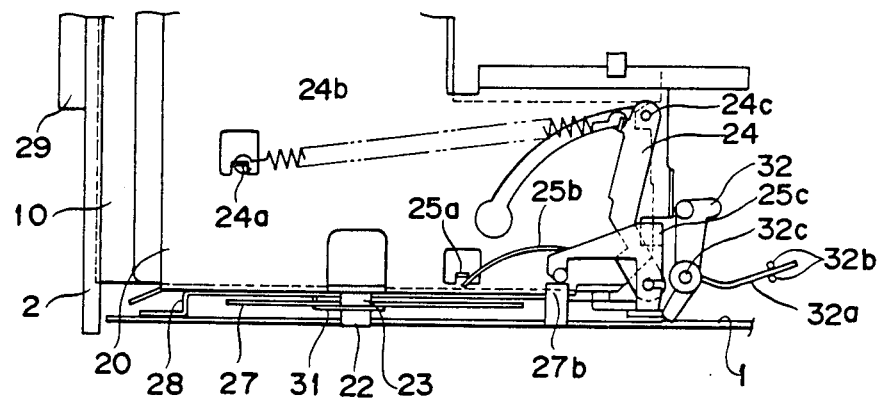
Figure 23H:
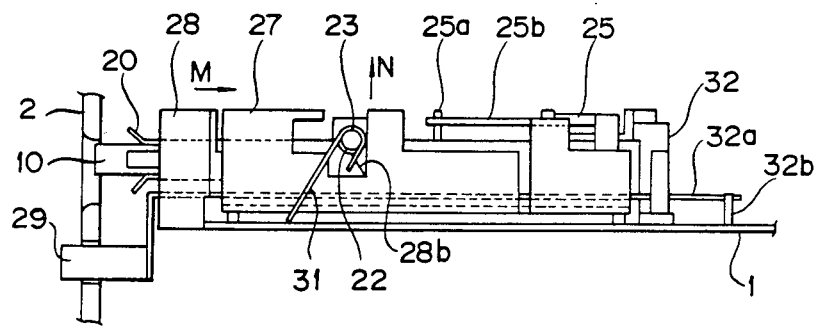
Figure 23:
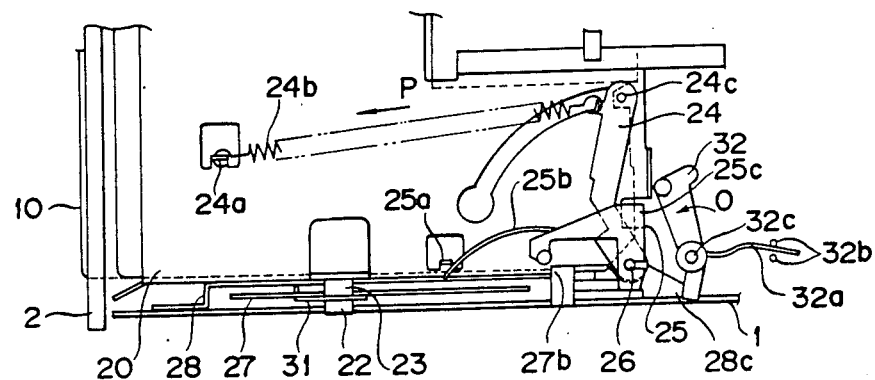

On the other hand, to eject the cassette 10, the operator presses the button 29 (refer to FIG. 1) so that the lift plate 28 slides in the direction of an arrow M. When this happens, the inclined portion 28b formed on the lift plate 28 contacts the roller 23, pushing up the roller 23 in the direction of an arrow N (FIG. 23G and FIG. 23H).

Figure 23J:
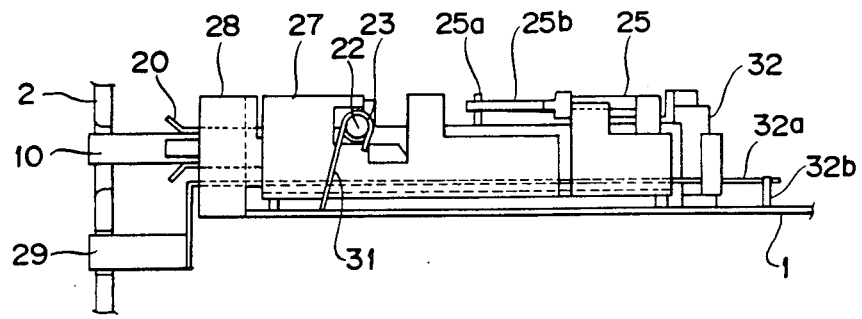

When the lift plate 28 is pushed further, the edge portion 28c of the lift plate 28 contacts one arm of the eject lever 32 so that the sliding motion of the lift plate 28 is transmitted to the eject lever 32. The eject lever 32 rotates in the direction of an arrow O pushing on the front edge of one arm of the eject lever 32, so that the cassette holder 20 slides in the direction of an arrow P (FIG. 23I and FIG. 23J).

When the sliding action of the cassette guide 20 is transmitted to a position where the rounded portion on the front edge of the latch 25 goes beyond the corner portion 27b of the bent portion of the side plate 27, the latch 25 is rotated in the direction of an arrow Q by the spring force of the thin flat member 25b, and locks (FIG. 23K and FIG. 23L) so that even if the operator stops pressing the button, the cassette holder 20 will not be slid by the force of the spring 31.

Figure 24A:
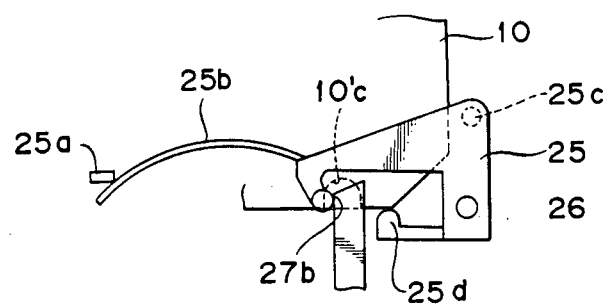
FIGS. 24A and 24B are drawings explaining a cassette latch operation by a latch member in the system shown in FIG. 1.
Figure 24B:
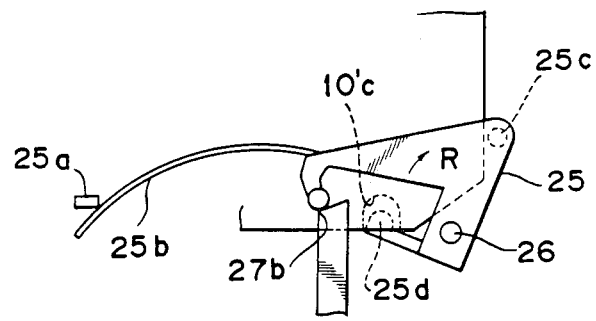
Figure 25A:
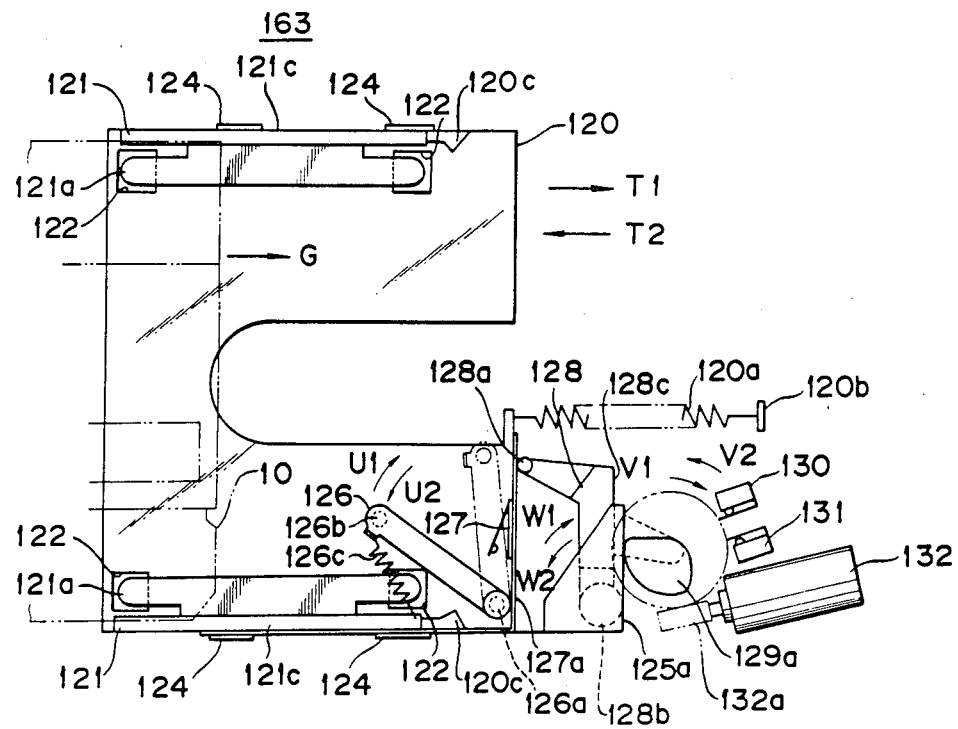
FIGS. 25A and 25B are a plan view and a side view respectively showing another arrangement of a cassette loading and ejection mechanism.

On the other hand, as shown in FIGS. 24A and 24B, the latch 25 is arranged so that the cassette 10 is held by the latch hook 25d holding the spare hole 10c'. That is, when the front edge of the cassette 10 does not contact with the latch pin portion 25c, the latch hook 25d is positioned so that it does not interfere with the side of the cassette 10 (FIG. 25A).

When the latch 25 is pressed by the cassette and rotates in the direction of the arrow R, the latch hook portion 25d enters the spare hole 10c' so as to hold the cassette 10 (FIG. 24B).

Figure 23K:
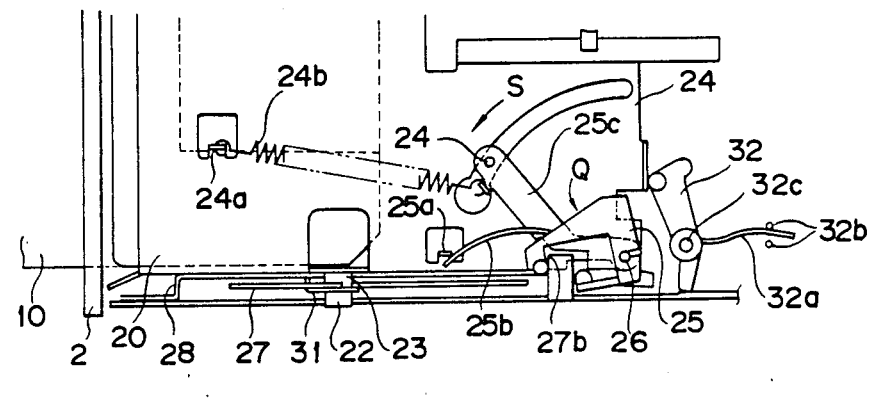
Figure 23L:
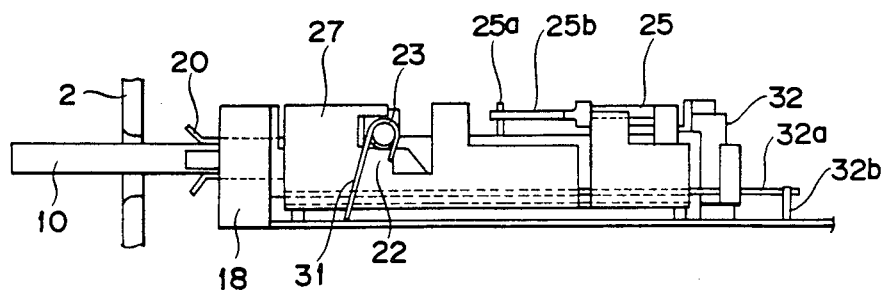

During ejection, the latch 25 rotates in the opposite direction to the direction of the arrow R so as to free the cassette 10. Consequently, the cassette 10 which has been released from the latch 25 is slid in the direction of the arrow T by the rotation (in the direction of the arrow S) of the chassis lever 24 which is biased by the chassis spring 24b and the ejection operation is completed (FIG. 23K and FIG. 23L).

As shown in FIGS. 1, 23A-23L, 24A and 24B, in a cassette loading and ejection mechanism a holder (the cassette holder 20) which accepts a recording medium (cassette 10) from the first direction (direction G) and is movable in the direction (the direction L) crossing the first direction, a biasing means (the leaf spring 31) which biases the holder in the first and second directions, and latching means (the latch 25) which latches the holder in a predetermined position opposite the biasing means and releases the holder into the holder when the recording medium has been inserted into the holder as far as a predetermined position are disposed. Accordingly the loading operation of the recording medium is easy, and a satisfactory loading condition is always allowable.

Furthermore, in regard to the latch releasing operation of the latch means, a supporting means (the latch hook portion 25) is disposed so as to bias and support the above-mentioned recording medium in the first direction in the holder. This arrangement prevents changes in the position of the recording medium resulting from movement of the holder, thereby further improving the security of the loading operation.

Moreover, when the cassette has an opening for exposing a portion of the recording medium which is loaded in the cassette, and a shutter (the shutter 13) that allows for opening and closing of this opening, and an opening means (the shutter lever 24) is disposed for opening the above-mentioned opening by acting on the shutter during the process of inserting the cassette up to the above-mentioned predetermined position in the holder, the latch means is arranged so that the latch is released in relation to the action of the opening means. This arrangement allows for secure and satisfactory handling of the cassette as described above, that is a secure and satisfactory series of loading operations of opening an opening closed by a shutter and then loading a cassette up to a predetermined position.

Furthermore, a return means (the eject lever 32) is disposed to return the holder to its origin point in opposition to the biasing means. Further, the latch means and the opening means are arranged so that they move in unison with respect to the return operation and eject the cassette from the holder. This arrangement ensures that not only the cassette loading, but also the eject operations are performed satisfactorily so as to provide a system with excellent overall operability.

Next, an explanation will be made of another embodiment of a cassette loading/ejecting mechanism.

Figure 25B:
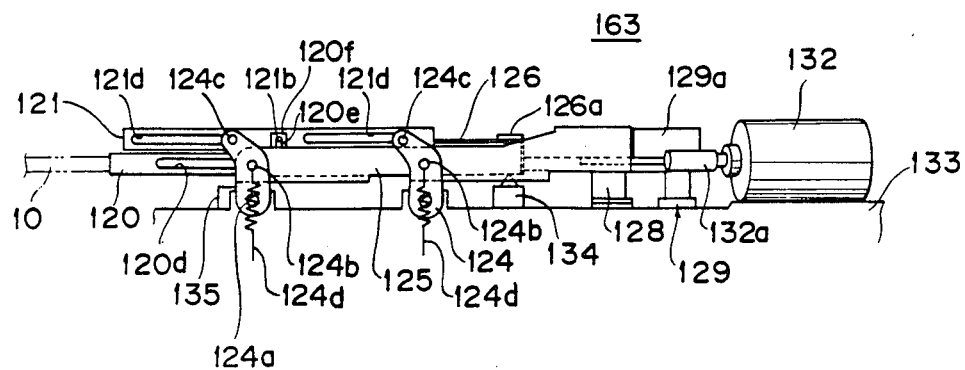

In FIGS. 25A and 25B, reference numeral 120 denotes a tray. This member performs the principal roles in inserting and ejecting a cassette and in chucking and chucking clearing.

A spring 120a is tensioned across the interval between the front edge of the tray 120 and a projection 120b protruding from a side of a base 133 of the mechanism. This spring 120a exerts a force on the tray 120 to move it in the direction of an arrow T1.

Furthermore, hooks 120c for fixing the cassette 10 to the tray side are disposed near the front edges of both the left and right side edges of the tray 120 and couple in notches 10c of the cassette 10.

Moreover, as shown in FIG. 25B, four long holes 120d are formed along the horizontal axes, two each on the left and the right, of the raised portions on the left and the right of the tray 120.

On the other hand, protrusions 120f protrude from the substantially center portion of the raised portions on the left and the right of the tray 120. Long holes 120e are formed on these protrusions 120f along a vertical axis.

On the other hand, on the upper side and on the right and left side edges of this tray 120 are disposed a right and left set of cassette guides 121. The cross section of these cassette guides 121 is formed into a substantially channel shape. A supporting member 121a protrudes horizontally towards the inside on the bottom of these cassette guides. This member 121a accepts the cassette 10 and guides it at the same time as it supports the cassette 10 above the tray. A bent member 121c is disposed protrudingly towards the inside on top of the cassette guides 121. Furthermore, a pin 121b which fits into the protrusion 120f is disposed protrudingly on the outside of these cassette guides 121.

This arrangement means that when the tray 120 slides, these cassette guides 121 can only move up and down with respect to the tray 120.

A square opening 122 that couples with positioning pins 134 and 135 is formed on the tray 120 in a position opposite the forward and rear end portions of the supporting member 121a.

Reference numeral 124 denotes a link arm formed in a substantially V shape and facing towards a forward side. A lower edge of the link arm 124 is coupled rotatably to a base 133 through a pin 124a. There are two each of these link arms on the left and right sides for a total of four.

The left and right link arms 124 are coupled rotatably at their midway bent portion to a long, narrow coupling plate 125 through a pin 124b. This coupling plate 125 is positioned on the outside of the left and right of the tray 120. As shown in FIG. 25A, a bent portion 125a is formed horizontally and biased towards the inside on a rear portion of this coupling plate.

Furthermore, long holes 121d are formed on a side of the cassette guide 121 at a predetermined distance from the front and back and along a horizontal axis. Pins 124c which are disposed protrudingly from the upper edge portion of the link arms 124 respectively are inserted slidably into these long holes 121d.

Moreover, a spring 124d is stretched between a midway point on the link arm 124 and the base 133, so that the link arm is balanced in the condition shown in FIG. 25B.

When the operation described below occurs, however, the spring 124d exerts a rotational force in a specified direction on the link arm 124.

An edge of the shutter release lever 126 is coupled rotatably to a position displaced towards a side of the front edge of the tray 120 through a pin 126a. A pin 126b is disposed protrudingly on the bottom side of the free end. The spring 126c then exerts a constant rotational force in the direction of an arrow U2 on the shutter release lever 126.

Furthermore, on a front edge of a side of the tray 120 on which is disposed the shutter release lever 126 is formed a bent portion 127a biased upwards. In the bent portion 127a a switch 127 which becomes ON with the rotation of the shutter release lever so that detecting that the cassette has been loaded in the correct position is fixed.

On the other hand, on the outside of the bent portion 127a an end of an arm 128 formed in a substantially L shape on the base 133 is rotatably coupled under the bent portion 125a through a shaft 128b. The other end of this arm 128 is connected to the bent portion 127a through the pin 128a.

The role of this arm 128 is to prevent the tray 120 being moved in the direction of an arrow T1 by the tensile force of the spring 120a. Further behind this arm 128 is disposed a worm-wheel fitted cam 129 that acts as the power source for chucking release and cassette eject actions.

Figure 26A:
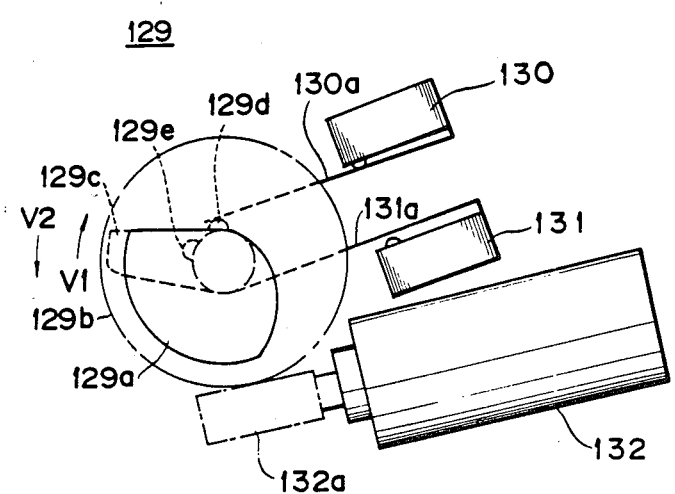
FIGS. 26A and 26B are a plan view and a side view respectively showing an arrangement of a drive mechanism for driving the cassette loading and ejection mechanism shown in FIGS. 25A and 25B.
Figure 26B:
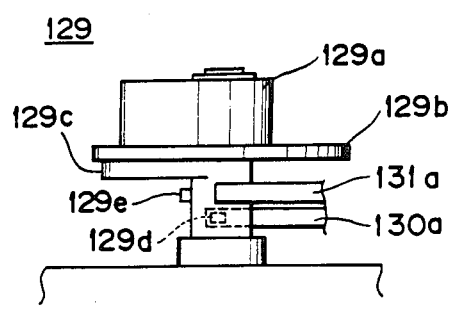

FIGS. 26A and 26B show details of this portion.

The worm-wheel fitted cam 129 has a worm wheel 129b. This is engaged with a worm 132a fixed on an output shaft of a motor 132 which can rotate both forward and reverse.

An upper cam 129a is fixed in an eccentric position on an upper surface of the worm wheel 129b. This cam contacts the outside edge of the bent portion 125a.

Furthermore, a lower cam 129c is disposed protrudingly on a lower side of the worm wheel 129b so that it partially overlaps with the upper cam 129a. This lower cam 129c contacts with the outer edge 128c of the arm 128, thereby restricting the movement of the arm 128 and indirectly restricting the movement of the tray 120.

Moreover, protrusions 129d and 129e are disposed on the outer circumference of the supporting shaft of the worm wheel 129b so that their predetermined angles are staggered, and in positions which are staggered vertically.

A switch 130 for detecting a home position and a switch 131 for detecting completion of the cassette loading are disposed near the worm wheel 129b. A contact member 130a is positioned so that it can contact the protrusion 129d, and a contact member 131a is positioned so that it can contact the protrusion 129e.

When these contact members and protrusions have contacted respectively, a home position detecting signal 130s and a cassette loading completion signal 131s described below are generated.

Figure 27:
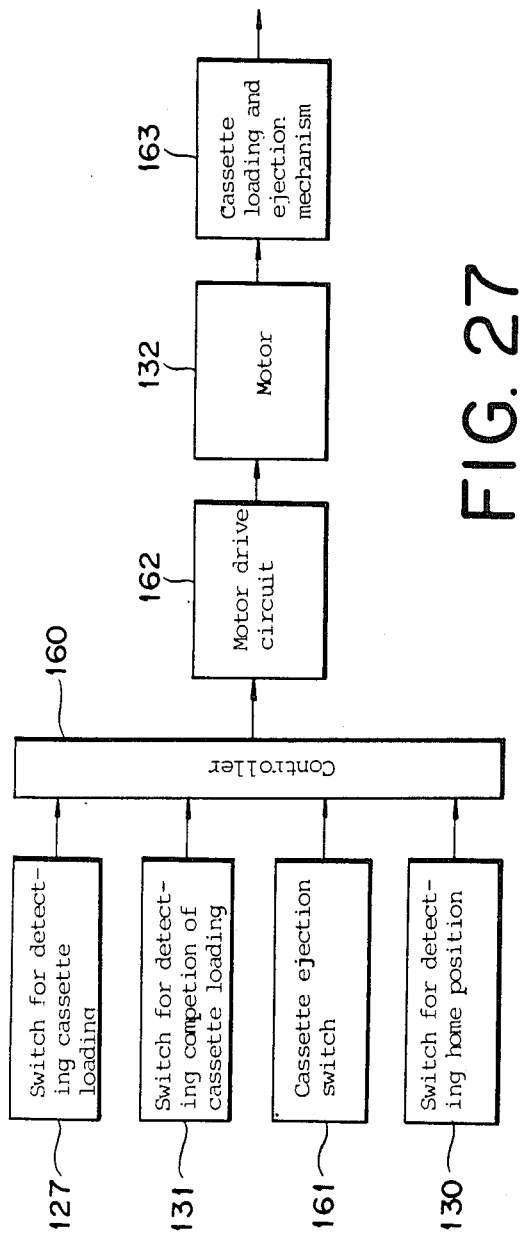
FIG. 27 is a block diagram showing an arrangement of a control circuit for controlling a drive mechanism.

FIG. 27 is a block diagram for a control circuit.

Reference numeral 160 in FIG. 27 is a controller. In addition to the signals of the switches described above, a signal from a cassette eject switch 161 is also input to this controller.

The controller 160 controls a motor 132 with various signals via a motor drive circuit 162 so that the overall cassette loading and ejection mechanism 163 is operated.

Next, an explanation will be made of the action of an embodiment arranged as described above.

Figure 28:
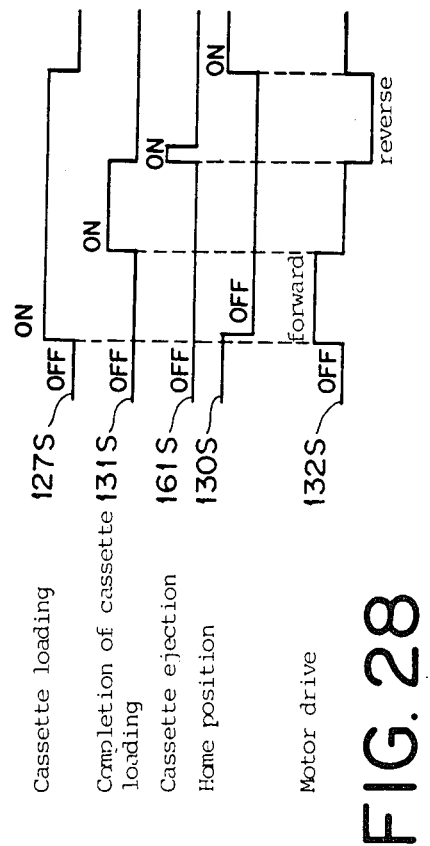
FIG. 28 is a timing chart showing an operating waveform for each portion of the control circuit shown in FIG. 27.

FIGS. 25A and 25B show the condition of a cassette loading mechanism before a cassette is loaded. In this condition, the cam 129c contacts the arm 128 and presses the tray 120 in the direction of an arrow T2 in response to the tensile force of the spring 120a through the arm 128. Then, the contact member 130a and the protrusion 129d contact so that the signal 130s for detecting that the tray is in the home position turns ON as shown in FIG. 28. The motor 132 is stationary.

Further, the cam 129a contacts the bent portion 125a so that it presses it to the maximum limit in the left direction as shown in FIG. 25B.

In this condition, as the cassette 10 is loaded along the cassette guide 121, soon the pin 126b of the shutter release lever 126 makes contact with the edge of the closed shutter 13 so that it begins to open.

Soon, at the same time that the hook 120c fits into the notch 10c on the cassette and locks, the switch 127 turns ON, and at the same time as the cassette loading signal 127s turns ON as shown in FIG. 28, the motor drive signal 132s turns ON and the motor begins to rotate.

The worm-wheel fitted cam 129 also begins to rotate in the direction (the loading direction) of an arrow V1.

As a result of this rotation, the cams 129a and 129c are displaced in the same direction and the arm 128 is rotated in the direction of an arrow W1 so that the tray 120 is slid in the direction of the arrow T1 by the force of the spring 120a. At the same time, the pin 124b of the link arm 124 moves inside the long hole 120d and contacts the left edge of the long hole 120d in FIG. 29B.

Figures 29A, 29B:
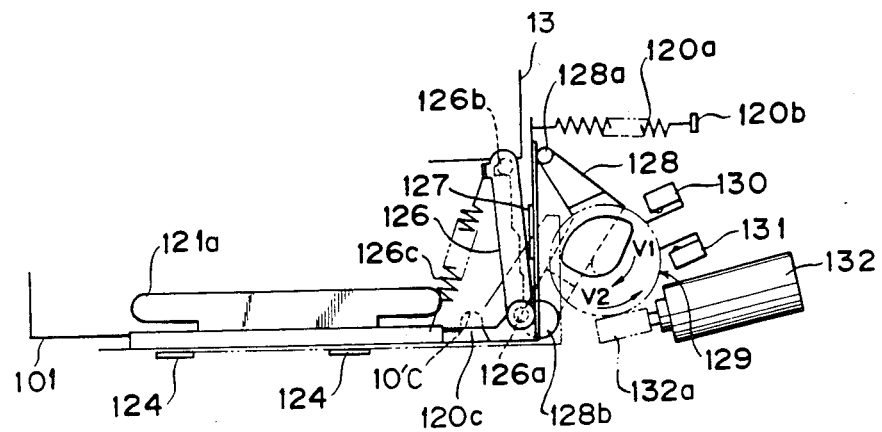
FIGS. 29A, 29B, 30A, 30B, 31A and 31B are drawings explaining operation of the cassette loading and ejection mechanism shown in FIGS. 25A and 25B.

When the arm 128 rotates from this position further in the direction of the arrow W1, the tray 120 slides further in the direction of the arrow T1 and the link arm 124 begins to rotate in the direction of an arrow X in FIG. 29B.

At this time the cam 129a rotates and moves away from the bent portion 125a of the coupling plate 125 so that the coupling plate 125 also moves to the right of FIGS. 29A and 29B. When the link arm 124 rotates in the direction of the arrow X the force of the spring 124d exerts a rotational force on the link arm 124 in the direction of the arrow X.

FIGS. 29A and 29B show this condition. At this time, the sliding action of the tray 120 in the direction of the arrow T1 is completed.

Figure 30A:
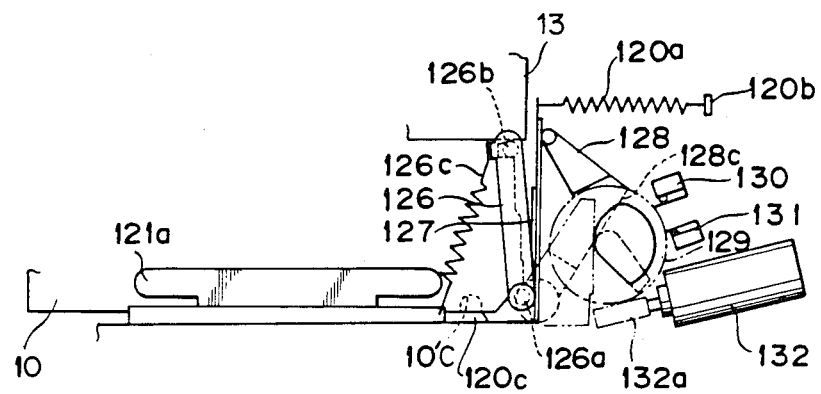

Following this, even if the worm-wheel fitted cam 129 rotates, the arm 128 contacts the base edge of the cam 129c as shown in FIG. 30A and so that it is not displaced, and the tray 120 does not slide.

Figure 30B:
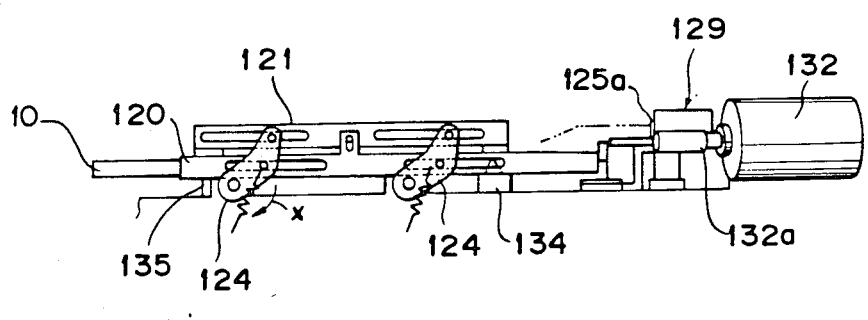

The bent portion 125a of the coupling plate 125 contacts the base portion of the cam 129a as shown in FIGS. 30A and 30B so that its movement is restricted, and so that the rotation of the link arm 124 in the direction of the arrow X is restricted to a predetermined angle range.

Figure 31A:
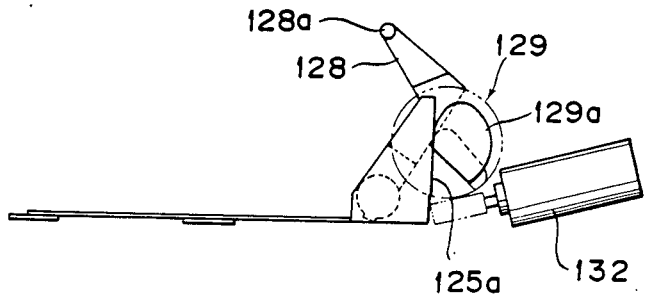
Figure 31B:
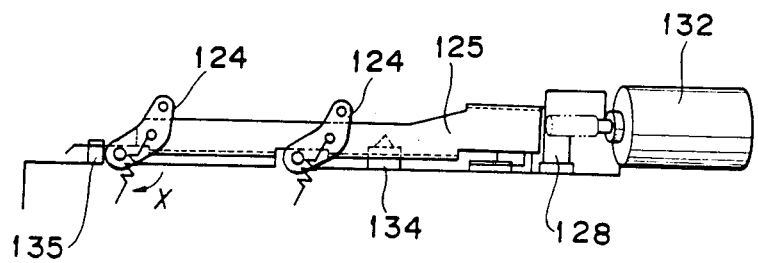

Consequently, the link arm 124 rotates gradually corresponding with the displacement of the cam 129a. FIGS. 31A and 31B show this condition.

On the other hand, the pin 124b in the center of the link arm 124 is lowered according to the rotation of the link arm so that the tray 120 lowers as shown in FIG. 30B and FIG. 31B and the cassette is set and correctly positioned on the positioning pins 134 and 135.

In this condition, the protrusion disposed on the worm wheel fitted cam 129 contacts the contact member 131a and a loading completion signal 131s is generated. This signal causes the motor 132 to stop rotating so that the cassette loading operation is completed.

On the other hand, the cassette ejection operation is exactly the opposite of the operation described above.

That is, in summary, an ejection signal 161s from either a cassette ejection switch such as the switch 29 (see FIG. 1) which is not shown in FIGS. 25A and 25B but which is disposed on a side of the unit, or from a host apparatus to which the unit is connected rotates the motor 132 in an opposite direction to that when loading so that the worm-wheel fitted cam 129 rotates in the direction of an arrow V2 and raises the tray 120 at the same time as it pushes the tray 120 in the direction of an arrow T2, thereby producing the situation shown in FIGS. 25A and 25B. Then, if the home position detection switch 130 turns ON, the rotation of the motor is stopped by that signal 130s.

In this condition, the operator can grip the outer edge of the cassette 10 with the fingers and pull it out from the unit.

In the embodiment explained above, mechanical swithces are used for the detection switches, but noncontact type sensors such as optical sensors are also acceptable.

In this manner, a cassette loading and ejection mechanism as shown in FIGS. 25A, 25B–31A and 31B allows for a relative reduction in the number of parts and a simplified arrangement, and can perform secure operations with a low rate of faults.

What is claimed is:

1. A cassette loading mechanism for a recording and/or reproducing apparatus comprising:
    a holder means for holding a recording medium, said holder means being movable in a first direction between a first position at which the recording medium is accepted and a second position, and being movable in a second direction nonparallel to said first direction, between said second position and a third position at which recording and/or reproducing is performed with respect to the recording medium;
    a first biasing means for biasing said holder means in said first direction;
    a second biasing means for biasing said holder means in said second direction;
    a first control means for moving said holder means from said first position to said second position by a biasing force produced by said first biasing means;
    a second control means for moving said holder means from said second position to said third position by a biasing force produced by said second biasing means;
    a third control means for controlling said first control means and said second control means to move said holder means from said first position to said third position through said second position, and from said third position to said first position through said second position;
    a detecting means for detecting an insertion of the recording medium into said holder means at said first position;
    a drive means for driving said third control means in response to the detection by said detecting means to control said first control means and said second control means; and
    a drive control means for detecting loading of the recording medium at said third position and for controlling said drive means.

2. A cassette loading mechanism for a recording and/or reproducing apparatus as claimed in claim 1, wherein said first biasing means has a spring, said holder means has a tray that is always biased in said first direction by said spring and a guide member which is attached to said tray and can be raised and lowered, and said tray is supported with a link arm that couples said guide member with a base of said apparatus and coupled to a long hole formed on both sides of said tray at an intermediate position through a pin, said second biasing means has a spring for biasing said link arm in said second direction, said first control means has an arm member rotatably supported on said base of said apparatus and engaged with said tray to control the movement of said tray in said first direction, said second control means has a slidable linkage plate to said pin at said intermediate position of said link arm, said third control means has a first cam for controlling said arm member and a second cam for controlling said slidable linkage plate, said drive means has a worm wheel on which said first and said second cams are formed, and a worm that engages with said worm wheel and a motor for rotating said worm, said detecting means has a switch disposed at a rear of said tray, and said drive control means has a home position detecting switch and a loading completion switch which are activated by said worm wheel to control the rotation of said worm wheel.

* * * * *